(12) United States Patent
Zou et al.

(10) Patent No.: US 12,189,089 B2
(45) Date of Patent: Jan. 7, 2025

(54) OPTICAL SYSTEM, IMAGE ACQUISITION MODULE AND ELECTRONIC DEVICE

(71) Applicant: JIANGXI JINGCHAO OPTICAL CO., LTD., Nanchang (CN)

(72) Inventors: Jinhua Zou, Nanchang (CN); Ming Li, Nanchang (CN)

(73) Assignee: JIANGXI JINGCHAO OPTICAL CO., LTD., Nanchang (CN)

( * ) Notice: Subject to any disclaimer, the term of this patent is extended or adjusted under 35 U.S.C. 154(b) by 513 days.

(21) Appl. No.: 17/536,006

(22) Filed: Nov. 27, 2021

(65) Prior Publication Data
US 2023/0063258 A1      Mar. 2, 2023

(30) Foreign Application Priority Data
Aug. 17, 2021    (CN) .......................... 202110944742.X

(51) Int. Cl.
    *G02B 13/00*    (2006.01)
    *G02B 9/64*     (2006.01)
(52) U.S. Cl.
    CPC .......... *G02B 13/0045* (2013.01); *G02B 9/64* (2013.01)
(58) Field of Classification Search
    CPC .............................. G02B 13/0045; G02B 9/64
    See application file for complete search history.

(56) References Cited

U.S. PATENT DOCUMENTS

| 4,981,344 A | 1/1991 | Ueda |
| 6,414,800 B1 | 7/2002 | Hamano |
| 6,985,309 B2 | 1/2006 | Shinohara |

(Continued)

FOREIGN PATENT DOCUMENTS

| CN | 1206842 A | 2/1999 |
| CN | 1297164 A | 5/2001 |

(Continued)

OTHER PUBLICATIONS

International Search Report dated on Jan. 15, 2020 on International Patent Application PCT/CN2019/110525, filed Jan. 3, 2020, in the name of Jiangxi Jingchao Optical Co. Ltd.

(Continued)

*Primary Examiner* — Christopher Stanford
(74) *Attorney, Agent, or Firm* — Franklin & Associates International Inc; Matthew F. Lambrinos

(57) ABSTRACT

The present disclosure relates to an optical system, an image acquisition module and an electronic device. The optical system includes, successively in order from an object side to an image side: a first lens having a negative refractive power; a second lens having a refractive power, an object side surface thereof being convex; a third lens having a positive refractive power, an image side surface thereof being convex; a fourth lens having a negative refractive power; a fifth lens having a positive refractive power; a sixth lens having a positive refractive power, an image side surface thereof being convex; a seventh lens having negative refractive power, an object side surface thereof being concave. The optical system satisfies the following condition: $0<100/(f2*|f1|)\leq 2.0$ mm$^{-2}$; where f2 is an effective focal length of the second lens, and f1 is an effective focal length of the first lens.

12 Claims, 14 Drawing Sheets

(56) References Cited

U.S. PATENT DOCUMENTS

| | | | | |
|---|---|---|---|---|
| 8,503,093 | B2* | 8/2013 | Kurashige | G02B 15/144507 |
| | | | | 359/689 |
| 9,057,868 | B1 | 6/2015 | Chung et al. | |
| 11,169,362 | B2* | 11/2021 | Zhang | G02B 13/0045 |
| 2004/0218285 | A1 | 11/2004 | Amanai | |
| 2004/0264003 | A1 | 12/2004 | Noda | |
| 2005/0046970 | A1 | 3/2005 | Amanai | |
| 2008/0106801 | A1 | 5/2008 | Kang et al. | |
| 2010/0254029 | A1 | 10/2010 | Shinohara | |
| 2012/0075718 | A1 | 3/2012 | Seo | |
| 2014/0063620 | A1 | 3/2014 | Jung et al. | |
| 2015/0138425 | A1 | 5/2015 | Lee | |
| 2016/0124192 | A1 | 5/2016 | Koreeda | |
| 2016/0161709 | A1 | 6/2016 | Hsueh et al. | |
| 2017/0307858 | A1 | 10/2017 | Chen | |
| 2018/0113282 | A1 | 4/2018 | Tsai | |
| 2020/0073092 | A1 | 3/2020 | Chen | |
| 2022/0196983 | A1* | 6/2022 | Dai | G02B 9/64 |

FOREIGN PATENT DOCUMENTS

| | | | |
|---|---|---|---|
| CN | 101093274 A | 12/2007 | |
| CN | 101983348 A | 3/2011 | |
| CN | 102132189 A | 7/2011 | |
| CN | 102419470 A | 4/2012 | |
| CN | 102466864 A | 5/2012 | |
| CN | 202522758 U | 11/2012 | |
| CN | 102914851 A | 2/2013 | |
| CN | 102985865 A | 3/2013 | |
| CN | 102998774 A | 3/2013 | |
| CN | 103676088 A | 3/2014 | |
| CN | 103852858 A | 6/2014 | |
| CN | 103969804 A | 8/2014 | |
| CN | 104570277 A | 4/2015 | |
| CN | 104570295 A | 4/2015 | |
| CN | 104914558 A | 9/2015 | |
| CN | 104932086 A | 9/2015 | |
| CN | 204631345 U | 9/2015 | |
| CN | 105259636 A | 1/2016 | |
| CN | 105372793 A | 3/2016 | |
| CN | 105607232 A | 5/2016 | |
| CN | 105607233 A | 5/2016 | |
| CN | 205210492 U | 5/2016 | |
| CN | 205210493 U | 5/2016 | |
| CN | 105988185 A | 10/2016 | |
| CN | 105988186 A | 10/2016 | |
| CN | 106033141 A | 10/2016 | |
| CN | 106154496 A | 11/2016 | |
| CN | 106338815 A | 1/2017 | |
| CN | 106526796 A | 3/2017 | |
| CN | 206074890 U | 4/2017 | |
| CN | 106610518 A | 5/2017 | |
| CN | 106646825 A | 5/2017 | |
| CN | 106772931 A | 5/2017 | |
| CN | 106773008 A | 5/2017 | |
| CN | 106802469 A | 6/2017 | |
| CN | 106842512 A | 6/2017 | |
| CN | 106842514 A | 6/2017 | |
| CN | 106896474 A | 6/2017 | |
| CN | 106959500 A | 7/2017 | |
| CN | 106970464 A | 7/2017 | |
| CN | 107024756 A | 8/2017 | |
| CN | 107102425 A | 8/2017 | |
| CN | 107167897 A | 9/2017 | |
| CN | 107167902 A | 9/2017 | |
| CN | 206460205 U | 9/2017 | |
| CN | 107290843 A | 10/2017 | |
| CN | 206946078 U | 1/2018 | |
| CN | 107703609 A | 2/2018 | |
| CN | 107831588 A | 3/2018 | |
| CN | 207164341 U | 3/2018 | |
| CN | 107976770 A | 5/2018 | |
| CN | 108089278 A | 5/2018 | |
| CN | 108089317 A | 5/2018 | |
| CN | 207424362 U | 5/2018 | |
| CN | 207424363 U | 5/2018 | |
| CN | 108107548 A | 6/2018 | |
| CN | 108227146 A | 6/2018 | |
| CN | 207557562 U | 6/2018 | |
| CN | 108459394 A | 8/2018 | |
| CN | 108761745 A | 11/2018 | |
| CN | 108873250 A | 11/2018 | |
| CN | 109283665 A | 1/2019 | |
| CN | 109375346 A | 2/2019 | |
| CN | 208506348 U | 2/2019 | |
| CN | 109407267 A | 3/2019 | |
| CN | 109725406 A | 5/2019 | |
| CN | 109752823 A | 5/2019 | |
| CN | 109814234 A | 5/2019 | |
| CN | 109814235 A | 5/2019 | |
| CN | 208833988 U | 5/2019 | |
| CN | 208872939 U | 5/2019 | |
| CN | 208888449 U | 5/2019 | |
| CN | 109870786 A | 6/2019 | |
| CN | 109870788 A | 6/2019 | |
| CN | 109917533 A | 6/2019 | |
| CN | 110018556 A | 7/2019 | |
| CN | 209070186 U | 7/2019 | |
| CN | 110109226 A | 8/2019 | |
| CN | 110208927 A | 9/2019 | |
| CN | 110261997 A | 9/2019 | |
| CN | 110398815 A | 11/2019 | |
| CN | 110426822 A | 11/2019 | |
| CN | 110531500 A | 12/2019 | |
| CN | 110568583 A | 12/2019 | |
| CN | 110618522 A | 12/2019 | |
| CN | 209765129 U | 12/2019 | |
| CN | 110646919 A | 1/2020 | |
| CN | 110646921 A | 1/2020 | |
| CN | 110794555 A | 2/2020 | |
| CN | 110879454 A | 3/2020 | |
| CN | 111007649 A | 4/2020 | |
| CN | 111025600 A | 4/2020 | |
| CN | 111308688 A | 6/2020 | |
| CN | 111338057 A | 6/2020 | |
| CN | 210720853 U | 6/2020 | |
| CN | 111399186 A | 7/2020 | |
| CN | 211786331 U | 10/2020 | |
| CN | 112505899 A * | 3/2021 | ......... G02B 13/0045 |
| JP | 2008268977 A | 11/2008 | |
| JP | 2013235242 A | 11/2013 | |
| KR | 1020140135909 A | 11/2014 | |
| TW | 201350956 A | 12/2013 | |
| TW | I625567 B | 6/2018 | |
| TW | I640811 B | 11/2018 | |
| TW | I655474 B | 4/2019 | |
| WO | 2003046633 A2 | 6/2003 | |
| WO | 2014162779 A1 | 10/2014 | |
| WO | 2015159721 A1 | 10/2015 | |
| WO | 2017180362 A1 | 10/2017 | |
| WO | 2020073978 A1 | 4/2020 | |
| WO | 2020220444 A1 | 11/2020 | |
| WO | 2020258269 A1 | 12/2020 | |
| WO | 2021026869 A1 | 2/2021 | |
| WO | 2021072745 A1 | 4/2021 | |
| WO | 2021087661 A1 | 5/2021 | |
| WO | 2021087669 A1 | 5/2021 | |
| WO | 2021102943 A1 | 6/2021 | |
| WO | 2021103797 A1 | 6/2021 | |
| WO | 2021109127 A1 | 6/2021 | |
| WO | 2021138754 A1 | 7/2021 | |
| WO | 2021179207 A1 | 9/2021 | |
| WO | 2021184164 A1 | 9/2021 | |
| WO | 2021184165 A1 | 9/2021 | |
| WO | 2021184167 A1 | 9/2021 | |
| WO | 2021203277 A1 | 10/2021 | |
| WO | 2021217504 A1 | 11/2021 | |
| WO | 2021217664 A1 | 11/2021 | |

OTHER PUBLICATIONS

U.S. Appl. No. 17/284,467, 371 filed Apr. 11, 2021, in the name of Jiangxi Jingchao Optical Co. Ltd.

(56) References Cited

OTHER PUBLICATIONS

International Search Report on International Patent Application PCT/CN2019/100747, filed Aug. 8, 2019, in the name of Jiangxi Jingchao Optical Co. Ltd.
U.S. Appl. No. 17/601,075, 371 filed Oct. 3, 2021, in the name of Jiangxi Jingchao Optical Co. Ltd.
International Search Report dated Mar. 27, 2019 on International Patent Application PCT/CN2020/072135, filed Jan. 15, 2020, in the name of Jiangxi Jingchao Optical Co. Ltd.
U.S. Appl. No. 17/440,786, 371 filed Sep. 19, 2021, in the name of Jiangxi Jingchao Optical Co. Ltd.
U.S. Appl. No. 17/605,985, 371 filed Oct. 22, 2021, in the name of OFilm Group Co. Ltd. and Jiangxi Jingchao Optical Co. Ltd.
International Search Report on International Patent Application PCT/CN2019/115349, filed Dec. 4, 2019, in the name of Jiangxi Jingchao Optical Co. Ltd.
U.S. Appl. No. 17/606,005, 371 filed Oct. 22, 2021, in the name of Jiangxi Jingchao Optical Co. Ltd.
International Search Report on International Patent Application PCT/CN2019/093780, filed Jun. 28, 2019, in the name of Jiangxi Jingchao Optical Co. Ltd.
U.S. Appl. No. 17/605,537, 371 filed Oct. 21, 2021, in the name of Jiangxi Jingchao Optical Co. Ltd.
International Search Report dated Apr. 30, 2019 on International Patent Application PCT/CN2019/091801 filed Jun. 19, 2019, in the name of Jiangxi Jingchao Optical Co. Ltd.
U.S. Appl. No. 17/604,739, 371 filed Oct. 18, 2021, in the name of Jiangxi Jingchao Optical Co. Ltd.
International Search Report on International Patent Application PCT/CN2019/122072, filed Nov. 29, 2019, in the name of Jiangxi Jingchao Optical Co. Ltd.
U.S. Appl. No. 17/606,027, 371 filed Oct. 23, 2021, in the name of Jiangxi Jingchao Optical Co. Ltd.
International Search Report on International Patent Application PCT/CN2019/111957, filed Oct. 18, 2019, in the name of Jiangxi Jingchao Optical Co. Ltd.
U.S. Appl. No. 17/606,040, 371 filed Oct. 24, 2021, in the name of Jiangxi Jingchao Optical Co. Ltd.
International Search Report dated Nov. 4, 2019 on International Patent Application PCT/CN2019/115318 filed Jul. 1, 2020, in the name of Jiangxi Jingchao Optical Co. Ltd.
U.S. Appl. No. 17/606,359, 371 filed Oct. 25, 2021, in the name of Jiangxi Jingchao Optical Co. Ltd.
International Search Report on International Patent Application PCT/CN2020/079517, filed Mar. 16, 2020, in the name of Jiangxi Jingchao Optical Co. Ltd.
U.S. Appl. No. 17/609,381, 371 filed Nov. 6, 2021, in the name of Jiangxi Jingchao Optical Co. Ltd.
International Search Report dated Jul. 16, 2020 on International Patent Application PCT/CN2019/123679 filed Aug. 25, 2020, in the name of Jiangxi Jingchao Optical Co. Ltd.
U.S. Appl. No. 17/610,693, 371 filed Nov. 11, 2021, in the name of Jiangxi Jingchao Optical Co. Ltd.
International Search Report on International Patent Application PCT/CN2020/070404, filed Jan. 6, 2020, in the name of Jiangxi Jingchao Optical Co. Ltd.
U.S. Appl. No. 17/440,691, 371 filed Sep. 17, 2021, in the name of Jiangxi Jingchao Optical Co. Ltd.
International Search Report dated Dec. 16, 2020 on International Patent Application PCT/CN2020/079515 filed Dec. 23, 2020, in the name of Jiangxi Jingchao Optical Co. Ltd.
U.S. Appl. No. 17/611,148, 371 filed Nov. 13, 2021, in the name of Jiangxi Jingchao Optical Co. Ltd.
International Search Report on International Patent Application PCT/CN2020/087819, filed Apr. 29, 2020, in the name of Jiangxi Jingchao Optical Co. Ltd.
U.S. Appl. No. 17/611,162, 371 filed Nov. 14, 2021, in the name of Jiangxi Jingchao Optical Co. Ltd.
International Search Report on International Patent Application PCT/CN2020/103797, filed Jul. 23, 2020, in the name of OFilm Group Co. Ltd.
U.S. Appl. No. 17/612,556, 371 filed Nov. 18, 2021, in the name of Jiangxi Jingchao Optical Co. Ltd.
International Search Report on International Patent Application PCT/CN2020/079526, filed Mar. 16, 2020, in the name of Jiangxi Jingchao Optical Co. Ltd.
U.S. Appl. No. 17/611,165, 371 filed Nov. 14, 2021, in the name of Jiangxi Jingchao Optical Co. Ltd.
International Search Report dated Nov. 3, 2020 on International Patent Application PCT/CN2020/078814 filed Nov. 26, 2020, in the name of Jiangxi Jingchao Optical Co. Ltd.
U.S. Appl. No. 17/611,569, 371 filed Nov. 16, 2021, in the name of Jiangxi Jingchao Optical Co. Ltd.
International Search Report on International Patent Application PCT/CN2020/083697, filed Apr. 8, 2020, in the name of Jiangxi Jingchao Optical Co. Ltd.
U.S. Appl. No. 17/614,359, 371 filed Nov. 25, 2021, in the name of Jiangxi Jingchao Optical Co. Ltd.
International Search Report on International Patent Application PCT/CN2020/088515, filed Apr. 30, 2020, in the name of Jiangxi Jingchao Optical Co. Ltd.
U.S. Appl. No. 17/614,499, 371 filled Nov. 26, 2021, in the name of OFilm Group Co. Ltd. and Jiangxi Jingchao Optical Co. Ltd.
U.S. Appl. No. 17/536,010, filed Nov. 27, 2021, in the name of Jiangxi Jingchao Optical Co. Ltd.

\* cited by examiner

OPTICAL SYSTEM, IMAGE ACQUISITION MODULE AND ELECTRONIC DEVICE

CROSS-REFERENCE TO RELATED APPLICATIONS

This application claims to the priority of Chinese Patent Application No. 202110944742X, filed on Aug. 17, 2021, the entire contents of which is incorporated herein by reference.

TECHNICAL FIELD

The present disclosure relates to the camera field, in particular to an optical system, an image acquisition module, and an electronic device.

BACKGROUND

With the gradual development of photographic imaging technology, consumers have higher and higher requirements for camera performance of an electronic device. At present, a five-type camera lens has a relatively high application rate, but it is difficult to meet consumers' demand for high resolution. Compared with the five-lens type camera lens, a seven-lens type camera lens can obtain relatively higher restitution and greater design flexibility, which can be more applied in high-end electronic device to obtain higher capturing resolution and definition. On the other hand, due to the development of photography and imaging technology, consumers have gradually increased their demand for various capturing. In particular, consumers have a high demand for capturing group photos, large scenes, etc. Therefore, how to increase the capturing range of a camera lens has become one of the focuses of the market. However, the current angle of field of view of the camera lens has room for improvement, because it is difficult to meet the requirements of capturing in large range.

SUMMARY

According to various embodiments, an optical system, an image acquisition module and an electronic device are provided.

An optical system includes, successively in order from an object side to an image side:
- a first lens having a negative refractive power;
- a second lens having a refractive power, an object side surface of the second lens being convex near an optical axis;
- a third lens having a positive refractive power, an image side surface of the third lens being convex near the optical axis;
- a fourth lens having a negative refractive power;
- a fifth lens having a positive refractive power;
- a sixth lens having a positive refractive power, an image side surface of the sixth lens being convex near the optical axis;
- a seventh lens having negative refractive power, an object side surface of the seventh lens being concave near the optical axis;
- wherein the optical system satisfies the following condition:

$$0 < 100/(f2 * |f1|) \leq 2.0 \text{ mm}^{-2};$$

where f2 is an effective focal length of the second lens, and f1 is an effective focal length of the first lens.

An image acquisition module includes a photosensitive element and the optical system according to any one of the above embodiments. The photosensitive element is arranged on the image side of the optical system.

An electronic device includes a housing and the image acquisition module as described above. The image acquisition module is located on the housing.

Details of one or more embodiments of the present disclosure will be given in the following description and attached drawings. Other features, objects and advantages of the present disclosure will become apparent from the description, drawings, and claims.

DETAILED DESCRIPTION OF THE EMBODIMENTS

Figure 1:
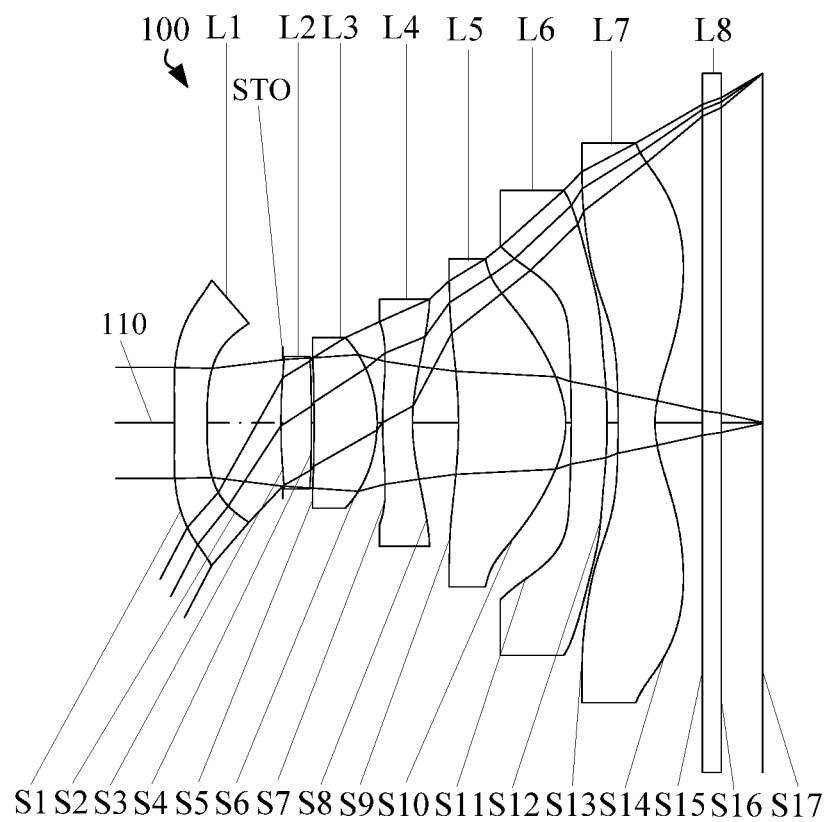
FIG. 1 is a schematic view of an optical system according to a first embodiment of the present disclosure.

In order to enable the above objects, features and advantages of the present disclosure more obvious and understandable, the specific embodiments of the present disclosure will be described in detail below with reference to the accompanying drawings. In the following description, many specific details are illustrated in order to aid in understanding of the present disclosure. However, the present disclosure can be implemented in many other ways different from those described herein, and those skilled in the art can make similar improvements without departing from the connotation of the present disclosure. Therefore, the present disclosure is not limited by the specific embodiments disclosed below.

In the description of the present disclosure, it should be understood that orientation or positional conditions indicated by terms "center", "longitudinal", "transverse", "length", "width", "thickness", "upper", "lower", "front", "rear", "left", "right", "vertical", "horizontal", "top", "bottom", "inner", "outer", "clockwise", "counterclockwise", "axial", "radial", "circumferential" etc. are based on orientation or positional relationships shown in the drawings, which are merely to facilitate the description of the present disclosure and simplify the description, not to indicate or imply that the device or elements must have a particular orientation, be constructed and operated in a particular orientation, and therefore cannot be construed as a limitation on the present disclosure.

In addition, the terms "first" and "second" are used for description only, and cannot be understood as indicating or implying relative importance or implicitly indicating the number of technical features indicated. Thus, the features defined with "first" and "second" may include at least one of the features explicitly or implicitly. In the description of the present disclosure, the meaning of "plurality" is at least two, for example, two, three or the like, unless explicitly and specifically defined otherwise.

In the present disclosure, unless explicitly specified and defined otherwise, terms "mounting", "connecting", "connected", and "fixing" should be understood in a broad sense. For example, it may be a fixed connection or a detachable connection, or an integration; may be a mechanical connection or electrical connection; may be a direct connection, or may be a connection through an intermediate medium, may be the communication between two elements or the interaction between two elements, unless explicitly defined otherwise. The specific meanings of the above terms in the present disclosure can be understood by one of those ordinary skills in the art according to specific circumstances.

In the present disclosure, unless expressly specified and defined otherwise, a first feature being "on" or "below" a second feature may mean that the first feature is in direct contact with the second feature, or may mean that the first feature is in indirect contact with the second feature through an intermediate medium. Moreover, the first feature being "above", "top" and "upside" on the second feature may mean that the first feature is directly above or obliquely above the second feature, or simply mean that the level of the first feature is higher than that of the second feature. The first feature being "below", "under" and "beneath" the second feature may mean that the first feature is directly below or obliquely below the second feature, or simply mean that the level of the first feature is smaller than that of the second feature.

It should be noted that when an element is referred to as being "fixed to" or "provided on" another element, it can be directly on another element or there may be an intermediate element therebetween. When an element is considered to be "connected to" another element, it can be directly connected to another element or there may be an intermediate element therebetween at the same time. The terms "vertical", "horizontal", "upper", "lower", "left", "right", and the like used herein are for illustrative purposes only and are not intended to be the only embodiments.

Referring to FIG. 1, according to some embodiments of the present disclosure, an optical system 100 includes, successively in order from an object side to an image side, a first lens L1, a second lens L2, a third lens L3, a fourth lens L4, a fifth lens L5, a sixth lens L6, and a seventh lens L7. Specifically, the first lens L1 includes an object side surface S1 and an image side surface S2. The second lens L2 includes an object side surface S3 and an image side surface S4. The third lens L3 includes an object side surface S5 and an image side surface S6. The fourth lens L4 includes an object side surface S7 and an image side surface S8. The fifth lens L5 includes an object side surface S9 and an image side surface S10. The sixth lens L6 includes an object side surface S11 and an image side surface S12. The seventh lens L7 includes an object side surface S13 and an image side surface S14. The first lens L1, the second lens L2, the third lens L3, the fourth lens L4, the fifth lens L5, the sixth lens L6, and the seventh lens L7 are coaxially arranged. A common axis of the lenses in the optical system 100 is an optical axis 110 of the optical system 100.

The first lens L1 has a negative refractive power, which is beneficial to large-angle light entering the optical system 100, thereby helping to expand the angle of field of view of the optical system 100, such that the optical system 100 has wide-angle characteristics. The second lens L2 has a refractive power, and the object side surface S3 of the second lens L2 is convex near the optical axis 110. The third lens L3 has a positive refractive power, and the image side surface S6 of the third lens L3 is convex near the optical axis 110, which can effectively converge the light, which is beneficial to shorten the total length of the optical system 100. The fourth lens L4 has a negative refractive power, which is beneficial to balance the chromatic aberration generated by the third lens L3, thereby improving the imaging quality of the optical system 100. The fifth lens L5 has a positive refractive power. The sixth lens L6 has a positive refractive power, and the image side surface S12 of the sixth lens L6 is convex near the optical axis 110, which is beneficial to further shorten the total length of the optical system 100 and realize a miniaturized design. The seventh lens L7 has a negative refractive power, and the object side surface S13 of the seventh lens L7 is concave near the optical axis 110, which is beneficial to shorten the back focus of the optical system 100, thereby further shortening the total length of the optical system 100.

In addition, in some embodiments, the optical system 100 is provided with a stop STO. The stop STO may be arranged between the first lens L1 and the second lens L2, or between the second lens L2 and the third lens L3. In some embodiments, the optical system 100 further includes an infrared filter L8 arranged on an image side of the seventh lens L7. The infrared filter L8 may be an infrared cut-off filter, which is used to filter interference light and prevent the interference light from reaching an imaging surface of the optical system 100 and affecting normal imaging. Further, the optical system 100 further includes an image surface S17 located on the image side of the seventh lens L7. The image surface S17 is the imaging surface of the optical system 100. The incident light adjusted by the first lens L1, the second lens L2, the third lens L3, the fourth lens L4, the fifth lens L5, the sixth lens L6, and the seventh lens L7 can be imaged on the image surface S17.

The second lens L2 may have a negative refractive power or a positive refractive power. When the second lens L2 has a negative refractive power, it is beneficial to further expand the angle of field of view of the optical system 100. In addition, the second lens L2 can also share the negative refractive power of the first lens L1, avoiding excessive refractive power of a single lens, which is beneficial to reduce the sensitivity of the optical system 100 and reduces the designing and processing difficulty of the first lens L1 and the second lens L2. When the second lens L2 has a positive refractive power, it is beneficial to converge light, thereby shortening the total length of the optical system 100.

In some embodiments, the object side surface S11 and the image side surface S12 of the sixth lens L6 are both aspherical, which is beneficial to correct the spherical aberration of the optical system 100. At least one of the object side surface S11 and the image side surface S12 of the sixth lens L6 has an inflection point, which is beneficial for correcting the aberration of the off-axis field of view and improving the imaging quality of the optical system 100.

In some embodiments, the object side surface and the image side surface of each lens of the optical system 100 are both aspherical. The use of an aspheric structure can improve the flexibility of lens design, effectively correct spherical aberration, and improve imaging quality. In other embodiments, the object side surface and the image side surface of each lens of the optical system 100 may also be spherical surfaces. It should be noted that the above-mentioned embodiments are only examples of some embodiments of the present disclosure. In some embodiments, the surfaces of the lenses in the optical system 100 may be any combination of the spherical surface and the aspheric surface.

In some embodiments, the lenses in the optical system 100 may be made of glass or plastic. The lens made of plastic can reduce the weight of the optical system 100 and reduce the production cost, which can realize the thin and light design of the optical system 100 with the small size of the optical system 100. The lens made of glass enables the optical system 100 to have excellent optical performance and higher temperature resistance. It should be noted that the lenses in the optical system 100 can also made of any combination of glass and plastic, and not necessarily all of them are made of glass or plastic.

It should be noted that the first lens L1 does not mean that there is only one lens. In some embodiments, there may also be two or more lenses in the first lens L1, and the two or more lenses can form a cemented lens. A surface of the cemented lens closest to the object side can be regarded as the object side S1, and a surface thereof closest to the image side can be regarded as the image side surface S2. Alternatively, the lenses in the first lens L1 does not form the cemented lens, but the distance between the lenses is relatively fixed. In this case, the object side surface of the lenses closest to the object side is the object side surface S1, and the image side surface of the lenses closest to the image side is the image side surface S2. In addition, in some embodiments, two or more lenses may also be arranged in the second lens L2, the third lens L3, the fourth lens L4, the fifth lens L5, the sixth lens L6, or the seventh lens L7. Any adjacent lenses may form the cemented lens, or a non-cemented lens.

Further, in some embodiments, the optical system 100 satisfies a condition: $0<100/(f2*|f1|)\leq 2.0$ mm$^{-2}$; where f2 is an effective focal length of the second lens L2, and f1 is an effective focal length of the first lens L1. Specifically, the value of $100/(f2*|f1|)$ may be −0.119, 0.325, 0.671, 0.893, 1.112, 1.448, 1.574, 1.835, 1.855, or 1.925. When the above condition is satisfied, the effective focal lengths of the first lens L1 and the second lens L2 can be reasonable, which is beneficial to expand the angle of field of view of the optical system 100, such that the optical system 100 has wide-angle characteristics to meet the requirements of capturing in large range.

In some embodiments, the optical system 100 satisfies a condition: $0.3$ mm$^{-1}\leq\tan(\mathrm{HFOV})/\mathrm{ImgH}\leq 0.56$ mm$^{-1}$; where HFOV is half of the maximum angle of field of view of the optical system 100, and ImgH is half of the image height of the optical system 100 corresponding to the maximum angle of field of view. Specifically, the value of $\tan(\mathrm{HFOV})/\mathrm{ImgH}$ may be 0.399, 0.401, 0.425, 0.441, 0.475, 0.499, 0.506, 0.528, 0.540, or 0.551, in a numerical unit of mm$^{-1}$ When the above condition is satisfied, it is beneficial to further expand the angle of field of view of the optical system 100 and achieve wide-angle characteristics, while it is also beneficial to match the optical system 100 with a larger-sized photosensitive element, thereby improving the resolution of the optical system 100. Moreover, it is also beneficial to further shorten the total length of the optical system 100, realizing a miniaturized design. Lower than the lower limit of the above condition, the angle of field of view of the optical system 100 is too small, which is not beneficial to meeting the requirements of capturing in large range, and the image height is too large, the external field of view aberration of the optical system 100 is difficult to correct, which is not beneficial to the improvement of imaging quality. Exceeding the upper limit of the above condition, the angle field of view of the optical system 100 is too large, which is not beneficial to the correction of distortion aberrations, and is likely to cause serious imaging deformation and cause the relative brightness of the field of view at the edge to decrease, which is not beneficial to the improvement of imaging quality.

It should be noted that, in some embodiments, the optical system 100 may be matched with a photosensitive element having a rectangular photosensitive surface. The imaging surface of the optical system 100 coincides with a photosensitive surface of the photosensitive element. In this case, the effective pixel area on the imaging surface of the optical system 100 has a horizontal direction and a diagonal direction, the HFOV can be understood as half of the maximum angle of field of view of the optical system 100 in the diagonal direction, and ImgH can be understood as half of the length of the effective pixel area on the imaging surface of the optical system 100 in the diagonal direction.

In some embodiments, the optical system 100 satisfies a condition: $-8\leq f6/f7\leq -3$; where f6 is an effective focal length of the sixth lens L6, and f7 is an effective focal length of the seventh lens L7. Specifically, the value of f6/f7 may be −7.257, −6.558, −6.323, −5.967, −5.555, −5.374, −4.852, −4.631, −4.220, or −3.885. When the above condition is satisfied, the ratio of the effective focal length of the sixth lens L6 to the effective focal length of the seventh lens L7 can be reasonably configured, which is beneficial to shorten the total length of the optical system 100, while it is beneficial to balance the positive and negative spherical aberration of the optical system 100, thereby improving the imaging quality. When f6/f7<−8, the refractive power of the sixth lens L6 is insufficient, which results in difficulty in correcting the off-axis aberration of the optical system 100. When f6/f7>−3, the refractive power of the sixth lens L6 is too strong, which easily results in excessive aberration correction of the optical system 100, which is not beneficial to the improvement of imaging quality.

In some embodiments, the optical system 100 satisfies a condition: $0.9\leq f/f5\leq 1.4$; where f is an effective focal length of the optical system 100, and f5 is an effective focal length of the fifth lens L5. Specifically, the value of f/f5 may be 1.021, 1.045, 1.093, 1.112, 1.135, 1.185, 1.204, 1.227, 1.231 or 1.239. When the above condition is satisfied, the ratio of the effective focal length of the optical system 100 to the effective focal length of the fifth lens L5 can be reasonably configured, which helps to expand the angle of field of view, while it is beneficial to enhance the ability of the fifth lens L5 to converge light. As such, it is beneficial to shorten the total length of the optical system 100. In addition, it is also beneficial to reduce the deflection angle of the light having a large field of view at the edge, thereby helping to correct the distortion aberration of the optical system 100.

In some embodiments, the optical system 100 satisfies a condition: −20≤(R13+R14)/R14≤−5; where R13 is a radius of curvature of the object side surface S13 of the seventh lens L7 at the optical axis 110, and R14 is a radius of curvature of the image side surface S14 of the seventh lens L7 at the optical axis 110. Specifically, the value of (R13+R14)/R14 may be −15.846, −15.021, −14.552, −13.354, −12.533, −11.851, −10.638, −9.885, −9.551, or −8.540. When the above condition is satisfied, the radii of curvature of the object side surface S13 and the image side surface S14 of the seventh lens L7 at the optical axis 110 can be reasonably configured, such that the object side surface S13 and the image side surface S14 of the seventh lens L7 will not be excessively curved. As such, it is beneficial to reduce the design and processing difficulty of the seventh lens L7, thereby reducing the sensitivity of the optical system 100. In addition, it can effectively reduce the angle of light entering the photosensitive element, thereby reducing the generation of coma of the optical system 100 and improving the imaging quality of the optical system 100.

In some embodiments, the optical system 100 satisfies a condition: 0.4≤CT6/|SAG61|≤1.1; where CT6 is a thickness of the sixth lens L6 on the optical axis 110, and SAG61 is a distance from an intersection between the object side surface S11 of the sixth lens L6 and the optical axis 110 to a portion of the object side surface S11 of the sixth lens L6 having the maximum effective aperture in a direction of the optical axis 110. Specifically, the value of CT6/|SAG61| may be 0.510, 0.571, 0.620, 0.694, 0.755, 0.796, 0.812, 0.834, 0.905, or 0.960. When the above condition is satisfied, it is beneficial for the optical system 100 to obtain a larger angle of field of view, while it is beneficial to the manufacture and forming of the sixth lens L6, reducing the defects due to poor forming. In addition, it is also beneficial to correct the aberrations of the optical system 100 and improve the imaging quality of the optical system 100. When CT6/SAG61<0.4, the surface shape of the object side surface S11 of the sixth lens L6 will be excessively curved, which increases the forming difficulty of the sixth lens L6 and affects the manufacturing yield. When CT6/SAG61>1.1, the surface shape of the object side surface S11 of the sixth lens L6 is excessively smooth, resulting in difficulty in aberration correction, and low relative brightness of the field of view at the edge, which affects the imaging quality of the optical system 100.

In some embodiments, the optical system 100 satisfies a condition: −1.5≤f7/R14≤−1.0; where f7 is an effective focal length of the seventh lens L7, and R14 is a radius of curvature of the image side surface S14 of the seventh lens L7 at the optical axis 110. Specifically, the value of f7/R14 may be −1.458, −1.425, −1.413, −1.402, −1.398, −1.395, −1.390, −1.386, −1.384, or −1.380. When the above condition is satisfied, the ratio of the effective focal length to the radius of curvature of the object side surface S13 of the seventh lens L7 can be reasonably configured, such that the surface shape of the object side surface S13 of the seventh lens L7 will not be excessively curved, and the design and processing difficulty of the seventh lens L7 can be reduced, thereby reducing defects due to poor forming. In addition, the surface shape of the object side surface S13 of the seventh lens L7 is prevented from being excessively smooth, which is beneficial for correcting aberrations and improving imaging quality.

In some embodiments, the optical system 100 satisfies a condition: 3.5≤R9/R10≤5.5; where R9 is a radius of curvature of the object side surface S9 of the fifth lens L5 at the optical axis 110, and R10 is a radius of curvature of the image side surface S10 of the fifth lens L5 at the optical axis 110. Specifically, the value of R9/R10 may be 3.793, 3.955, 4.215, 4.487, 4.532, 4.696, 4.721, 4.758, 4.803 or 4.848. When the above condition is satisfied, the ratio of the radius of curvature of the object side surface S9 to the radius of curvature of the image side surface S10 of the fifth lens L5 at the optical axis 110 can be reasonably configured, which is beneficial to reduce the design and processing difficulty of the fifth lens L5, thereby reducing the sensitivity of the fifth lens L5 and improving the forming yield, while avoiding total reflection of large-angle light inside the fifth lens L5, reducing the influence of ghost images and stray light on the imaging quality.

In some embodiments, the optical system 100 satisfies a condition: 2.0 mm$^{-1}$≤|R5/R6|/f3≤4.5 mm$^{-1}$; where R5 is a radius of curvature of the object side surface S5 of the third lens L3 at the optical axis 110, R6 is a radius of curvature of the image side surface S6 of the third lens L3 at the optical axis 110, and f3 is an effective focal length of the third lens L3. Specifically, the value of |R5/R6|/f3 may be: 2.324, 2.417, 2.551, 2.879, 3.214, 3.574, 3.722, 3.866, 3.954, or 4.165. When the above condition is satisfied, the surface shape and refractive power of the third lens L3 can be reasonably configured, which is beneficial to reducing the deflection angle of the light transmitting through the third lens L3, which is thus beneficial to the smooth transition of the light, and thus helps to increase the image surface area and helps correct the off-axis aberration.

A reference wavelength of the above effective focal length values is 587.5618 nm (d light).

Based on the description of the foregoing embodiments, more specific embodiments and drawings are illustrated below for detailed description.

First Embodiment

Figure 2:
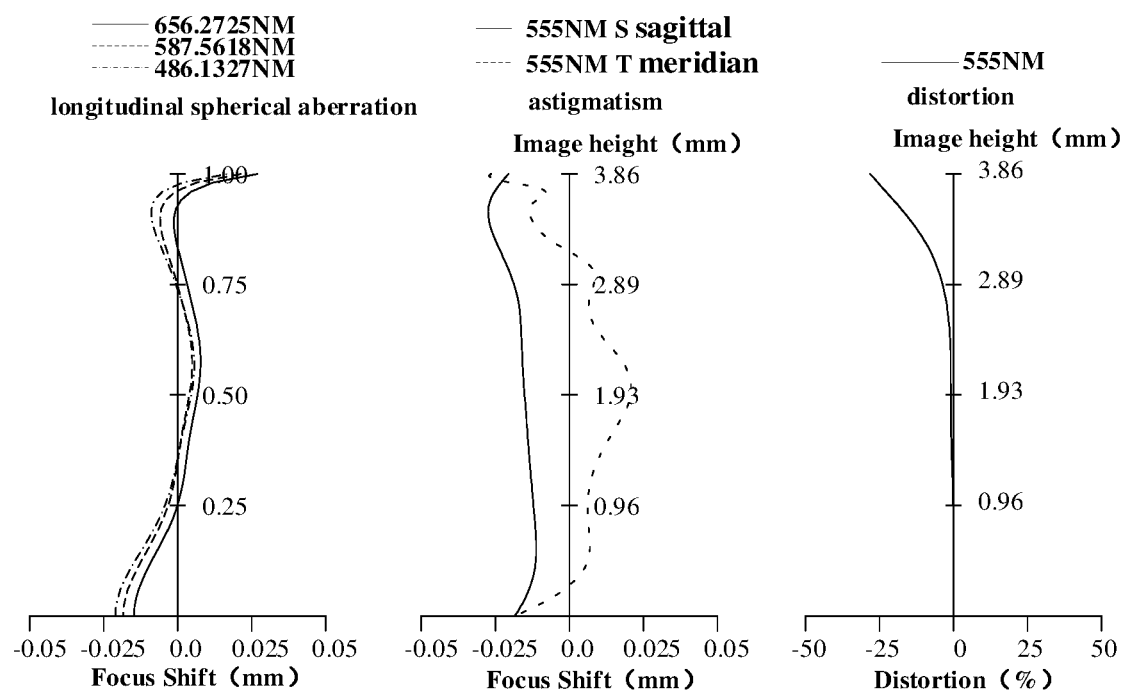
FIG. 2 is a graph showing longitudinal spherical aberration, astigmatism, and distortion of the optical system of FIG. 1.

Referring to FIGS. 1 and 2, FIG. 1 is a schematic view of an optical system 100 according to a first embodiment. The optical system 100 includes, successively in order from an object side to an image side, a first lens L1 having a negative refractive power, a stop STO, a second lens L2 having a positive refractive power, a third lens L3 having a positive refractive power, a fourth lens L4 having a negative refractive power, a fifth lens L5 having a positive refractive power, a sixth lens L6 having a positive refractive power, and a seventh lens L7 having a negative refractive power. FIG. 2 is a graph showing longitudinal spherical aberration, astigmatism, and distortion of the optical system 100 according to the first embodiment in order from left to right, where the reference wavelength of the astigmatism diagram and the distortion diagram is 587.5618 nm, and which are the same as other embodiments.

An object side surface S1 of the first lens L1 is concave near an optical axis 110 and convex at a circumference thereof.

An image side surface S2 of the first lens L1 is concave near the optical axis 110 and concave at the circumference thereof.

An object side surface S3 of the second lens L2 is convex near the optical axis 110 and convex at a circumference thereof.

An image side surface S4 of the second lens L2 is convex near the optical axis 110 and convex at the circumference thereof.

An object side surface S5 of the third lens L3 is concave near the optical axis 110 and concave at a circumference thereof.

An image side surface S6 of the third lens L3 is convex near the optical axis 110 and convex at the circumference thereof.

An object side surface S7 of the fourth lens L4 is convex near the optical axis 110 and concave at a circumference thereof.

An image side surface S8 of the fourth lens L4 is concave near the optical axis 110 and convex at the circumference thereof.

An object side surface S9 of the fifth lens L5 is concave near the optical axis 110 and concave at a circumference thereof.

An image side surface S10 of the fifth lens L5 is convex near the optical axis 110 and convex at the circumference thereof.

An object side surface S11 of the sixth lens L6 is concave near the optical axis 110 and concave at a circumference thereof.

An image side surface S12 of the sixth lens L6 is convex near the optical axis 110 and convex at the circumference thereof.

An object side surface S13 of the seventh lens L7 is concave near the optical axis 110 and convex at a circumference thereof.

An image side surface S14 of the seventh lens L7 is concave near the optical axis 110 and convex at the circumference thereof.

The object side surfaces and the image side surfaces of the first lens L1, the second lens L2, the third lens L3, the fourth lens L4, the fifth lens L5, the sixth lens L6, and the seventh lens L7 are all aspherical.

It should be noted that in this disclosure, when describing that a surface of the lens at the optical axis 110 (a central area of the surface) is convex, it can be understood that an area of this surface of the lens near the optical axis 110 is convex. When describing a surface of the lens is concave at a circumference thereof, it can be understood that an area of this surface approaching the maximum effective radius is concave. For example, when this surface is convex near the optical axis 110 and is also convex at a circumference thereof, a shape of this surface in a direction from its center (an intersection between this surface and the optical axis 110) to its edge may be completely convex, or may be first convex at its center and be then transitioned to be concave, and then become convex when approaching the maximum effective radius. These are only examples to illustrate the relationships between various shapes and structures (concave-convex relationships) of the surface at the optical axis 110 and at the circumference, and the various shapes and structures (concave-convex relationships) of the surface are not fully described, but other situations can be derived from the above examples.

The first lens L1, the second lens L2, the third lens L3, the fourth lens L4, the fifth lens L5, the sixth lens L6, and the seventh lens L7 are all made of plastic.

Further, the optical system 100 satisfies a condition: $100/(f2*|f1|)=1.703$ mm$^{-2}$; where f2 is an effective focal length of the second lens L2, and f1 is an effective focal length of the first lens L1. When the above condition is satisfied, effective focal lengths of the first lens L1 and the second lens L2 can be reasonable, which is beneficial to expand the angle of field of view of the optical system 100, such that the optical system 100 has wide-angle characteristics to meet the requirements of capturing in large range.

The optical system 100 satisfies a condition: tan(HFOV)/ImgH=0.496 mm$^{-1}$; where HFOV is half of the maximum angle of field of view of the optical system 100, and ImgH is half of the image height of the optical system 100 corresponding to the maximum angle of field of view. When the above condition is satisfied, it is beneficial to further expand the angle of field of view of the optical system 100 and achieve wide-angle characteristics, while it is also beneficial to match the optical system 100 with a larger-sized photosensitive element, thereby improving the resolution of the optical system 100. Moreover, it is also beneficial to further shorten the total length of the optical system 100, realizing a miniaturized design.

The optical system 100 satisfies a condition: f6/f7=−7.257; where f6 is an effective focal length of the sixth lens L6, and f7 is an effective focal length of the seventh lens L7. When the above condition is satisfied, the ratio of the effective focal length of the sixth lens L6 to the effective focal length of the seventh lens L7 can be reasonably configured, which is beneficial to shorten the total length of the optical system 100, while it is beneficial to balance the positive and negative spherical aberration of the optical system 100, thereby improving the imaging quality.

The optical system 100 satisfies a condition: f/f5=1.239; where f is an effective focal length of the optical system 100, and f5 is an effective focal length of the fifth lens L5. When the above condition is satisfied, the ratio of the effective focal length of the optical system 100 to the effective focal length of the fifth lens L5 can be reasonably configured, which helps to expand the angle of field of view, while it is beneficial to enhance the ability of the fifth lens L5 to converge light. As such, it is beneficial to shorten the total length of the optical system 100. In addition, it is also beneficial to reduce the deflection angle of the light having a large field of view at the edge, thereby helping to correct the distortion aberration of the optical system 100.

The optical system 100 satisfies a condition: (R13+R14)/R14=−8.540; where R13 is a radius of curvature of the object side surface S13 of the seventh lens L7 at the optical axis 110, and R14 is a radius of curvature of the image side surface S14 of the seventh lens L7 at the optical axis 110. When the above condition is satisfied, the radii of curvature of the object side surface S13 and the image side surface S14 of the seventh lens L7 at the optical axis 110 can be reasonably configured, such that the object side surface S13 and the image side surface S14 of the seventh lens L7 will not be excessively curved. As such, it is beneficial to reduce the design and processing difficulty of the seventh lens L7, thereby reducing the sensitivity of the optical system 100. In addition, it can effectively reduce the angle of light entering the photosensitive element, thereby reducing the generation of coma of the optical system 100 and improving the imaging quality of the optical system 100.

The optical system 100 satisfies a condition: CT6/|SAG61|=0.510; where CT6 is a thickness of the sixth lens L6 on the optical axis 110, and SAG61 is a distance from an intersection between the object side surface S11 of the sixth lens L6 and the optical axis 110 to a portion of the object side surface S11 of the sixth lens L6 having the maximum effective aperture in a direction of the optical axis 110. When the above condition is satisfied, it is beneficial for the optical system 100 to obtain a larger angle of field of view, while it is beneficial to the manufacture and forming of the sixth lens L6, reducing the defects due to poor forming. In addition, it is also beneficial to correct the aberrations of the optical system 100 and improve the imaging quality of the optical system 100.

The optical system 100 satisfies a condition: f7/R14=−1.409; where f7 is an effective focal length of the seventh lens L7, and R14 is a radius of curvature of the image side surface S14 of the seventh lens L7 at the optical axis 110. When the above condition is satisfied, the ratio of the effective focal length to the radius of curvature of the object side surface S13 of the seventh lens L7 can be reasonably configured, such that the surface shape of the object side surface S13 of the seventh lens L7 will not be excessively curved, and the design and processing difficulty of the seventh lens L7 can be reduced, thereby reducing defects due to poor forming. In addition, the surface shape of the object side surface S13 of the seventh lens L7 is prevented from being excessively smooth, which is beneficial for correcting aberrations and improving imaging quality.

The optical system 100 satisfies a condition: R9/R10=4.721; where R9 is a radius of curvature of the object side surface S9 of the fifth lens L5 at the optical axis 110, and R10 is a radius of curvature of the image side surface S10 of the fifth lens L5 at the optical axis 110. When the above condition is satisfied, the ratio of the radius of curvature of the object side surface S9 to the radius of curvature of the image side surface S10 of the fifth lens L5 at the optical axis 110 can be reasonably configured, which is beneficial to reduce the design and processing difficulty of the fifth lens L5, thereby reducing the sensitivity of the fifth lens L5 and improving the forming yield, while avoiding total reflection of large-angle light inside the fifth lens L5, reducing the influence of ghost images and stray light on the imaging quality.

The optical system 100 satisfies a condition: |R5/R6|/f3=2.908 $mm^{-1}$; where R5 is a radius of curvature of the object side surface S5 of the third lens L3 at the optical axis 110, R6 is a radius of curvature of the image side surface S6 of the third lens L3 at the optical axis 110, and f3 is an effective focal length of the third lens L3. When the above condition is satisfied, the surface shape and refractive power of the third lens L3 can be reasonably configured, which is beneficial to reducing the deflection angle of the light transmitting through the third lens L3, which is thus beneficial to the smooth transition of the light, and thus helps to increase the image surface area and helps to correct the off-axis aberration.

In addition, parameters of the optical system 100 are shown in Table 1. The image surface S17 in Table 1 can be understood as an imaging surface of the optical system 100. The elements from the object surface (not shown in figures) to the image surface 17 are arranged in the order of the elements in Table 1 from top to bottom. The Y radius in Table 1 is the radius of curvature of the object side surface or image side surface indicated by corresponding surface number at the optical axis 110. The surface numbers 1 and 2 indicate the object side surface S1 and the image side surface S2 of the first lens L1, respectively. That is, in the same lens, the surface with the smaller surface number is the object side surface, and the surface with the larger surface number is the image side surface. In the "thickness" parameter column of the first lens, the first value is the thickness of this lens on the optical axis, and the second value is a distance from the image side surface of this lens to the next surface in a direction toward the image side on the optical axis 110.

It should be noted that in this embodiment and the following various embodiments, the optical system 100 may not be provided with an infrared filter L8, but in this case, a distance from the image side surface S14 to the image side surface S17 of the seventh lens L7 remains unchanged.

In the first embodiment, the effective focal length of the optical system 10 is indicated by f, and f=2.80 mm. The f-number is indicated by FNO, and FNO=2.28. The half of the maximum angle of field of view is indicated by HFOV, and HFOV=62.4 deg. The total optical length s indicated by TTL, and TTL=6.48 mm. In the first embodiment and other embodiments, the optical system 100 satisfies: 57 deg≤HFOV≤64.8 deg; 6.295 mm≤TTL≤6.860 mm; ImgH=3.86 mm. It can be seen that the optical system 100 has wide-angle characteristics and can meet the requirements of miniaturized design, while also being able to match large-sized photosensitive elements and thus have good imaging quality.

The reference wavelengths of the focal length, the refractive index, and the Abbe number of each lens are all 587.5618 nm (d light), and which are the same in other embodiments.

TABLE 1

First Embodiment
f = 2.80 mm, FNO = 2.28, HFOV = 62.4 deg, TTL = 6.48 mm

| Surface Number | Surface Name Object Surface | Surface Shape | Y radius (mm) Infinite | Thickness (mm) Infinite | Material | Refractive index | Abbe number | Focal Length (mm) |
|---|---|---|---|---|---|---|---|---|
| S1 | First | Aspherical | −10.629 | 0.357 | Plastic | 1.544 | 56.11 | −7.802 |
| S2 | Lens | Aspherical | 7.152 | 0.836 | | | | |
| STO | Stop | Spherical | Infinite | −0.022 | | | | |
| S3 | Second | Aspherical | 5.753 | 0.337 | Plastic | 1.550 | 45.20 | 7.533 |
| S4 | Lens | Aspherical | −14.532 | 0.030 | | | | |
| S5 | Third | Aspherical | −14.387 | 0.693 | Plastic | 1.535 | 55.79 | 3.238 |
| S6 | Lens | Aspherical | −1.572 | 0.060 | | | | |
| S7 | Fourth | Aspherical | 3.916 | 0.330 | Plastic | 1.661 | 20.38 | −7.892 |
| S8 | Lens | Aspherical | 2.162 | 0.507 | | | | |
| S9 | Fifth | Aspherical | −5.051 | 1.181 | Plastic | 1.544 | 56.11 | 2.260 |
| S10 | Lens | Aspherical | −1.070 | 0.060 | | | | |
| S11 | Sixth | Aspherical | −31.218 | 0.395 | Plastic | 1.635 | 23.90 | 12.989 |
| S12 | Lens | Aspherical | −6.556 | 0.122 | | | | |
| S13 | Seventh | Aspherical | −12.116 | 0.407 | Plastic | 1.635 | 23.90 | −1.789 |
| S14 | Lens | Aspherical | 1.270 | 0.521 | | | | |
| S15 | Infrared | Spherical | Infinite | 0.210 | Glass | 1.517 | 64.17 | |

TABLE 1-continued

First Embodiment
f = 2.80 mm, FNO = 2.28, HFOV = 62.4 deg, TTL = 6.48 mm

| Surface Number | Surface Name Object Surface | Surface Shape Spherical | Y radius (mm) Infinite | Thickness (mm) Infinite | Material | Refractive index | Abbe number | Focal Length (mm) |
|---|---|---|---|---|---|---|---|---|
| S16 | Filter | Spherical | Infinite | 0.456 | | | | |
| S17 | Image Surface | Spherical | Infinite | 0.000 | | | | |

Further, the aspheric coefficients of the image side surface or the object side surface of the lenses of the optical system 100 are shown in Table 2. The surface numbers of S1 to S14 indicate the image side surface or the object side surface S1 to S14, respectively. K to A20 from top to bottom respectively represent the types of aspherical coefficients, where K represents the conic coefficient, A4 represents the fourth-order aspheric coefficient, A6 represents the sixth-order aspheric coefficient, and A8 represents the eighth-order aspheric coefficient, and so on. In addition, the aspheric coefficient formula is as follows:

$$Z = \frac{cr^2}{1 + \sqrt{1 - (k+1)c^2r^2}} + \sum_i Air^i$$

where Z is a distance from a corresponding point on an aspheric surface to a plane tangent to a vertex of the surface, r is a distance from a corresponding point on the aspheric surface to the optical axis 110, c is a curvature of the vertex of the aspheric surface, k is a conic coefficient, and Ai is a coefficient corresponding to the $i^{th}$ high-order term in the aspheric surface shape formula.

In addition, FIG. 2 includes a longitudinal spherical aberration diagram of the optical system 100, which shows that light of different wavelengths deviates from the focal point after transmitting through the lenses. The ordinate of the longitudinal spherical aberration diagram represents the normalized pupil coordinator from the center of the pupil to the edge of the pupil, and the abscissa thereof represents the distance from the imaging surface to the intersection of the light and the optical axis 110 (in a unit of mm) It can be seen from the longitudinal spherical aberration diagram that the deviation degree of the convergence point of the light of various wavelength in the first embodiment tends to be the same, and the diffuse spot or chromatic halo in the imaged picture is effectively prevented. FIG. 2 further includes an astigmatic field curves diagram of the optical system 100, where the S curve represents the sagittal field curvature at 587.5618 nm, and the T curve represents the meridian field curvature at 587.5618 nm. It can be seen from the diagram that the field curvature of the optical system 100 is small, the field curvature and astigmatism of each field of view are well corrected, and clear imaging can be achieved at the center and edges of the field of view. FIG. 2 further includes a distortion diagram of the optical system 100. It can be seen

TABLE 2

First Embodiment
Aspheric Coefficient

| Surface Number | S1 | S2 | S3 | S4 | S5 | S6 | S7 |
|---|---|---|---|---|---|---|---|
| K | 5.545E+00 | −2.788E+01 | 2.208E−01 | 1.335E+01 | −3.058E+01 | −1.695E+00 | −6.373E+00 |
| A4 | 1.875E−01 | 2.776E−01 | −3.247E−02 | 4.058E−02 | 4.211E−02 | −1.488E−01 | −2.145E−01 |
| A6 | −1.059E−01 | −1.208E−01 | 5.356E−01 | −7.018E−02 | −5.361E−02 | 3.629E−01 | 4.622E−01 |
| A8 | 6.152E−02 | 2.123E−01 | −6.910E+00 | −7.371E−01 | −1.038E+00 | −1.046E+00 | −1.280E+00 |
| A10 | −8.002E−03 | −3.124E−01 | 4.766E+01 | 6.157E+00 | 7.406E+00 | 1.534E+00 | 2.492E+00 |
| A12 | −2.583E−02 | 4.271E−01 | −2.021E+02 | −2.391E+01 | −2.584E+01 | −6.429E−01 | −3.290E+00 |
| A14 | 2.666E−02 | −3.619E−01 | 5.341E+02 | 5.490E+01 | 5.374E+01 | −1.640E+00 | 2.876E+00 |
| A16 | −1.239E−02 | 1.997E−01 | −8.605E+02 | −7.562E+01 | −6.727E+01 | 2.932E+00 | −1.602E+00 |
| A18 | 2.808E−03 | −5.733E−02 | 7.747E+02 | 5.742E+01 | 4.649E+01 | −1.959E+00 | 5.162E−01 |
| A20 | −2.496E−04 | −2.330E−03 | −2.996E+02 | −1.836E+01 | −1.354E+01 | 4.889E−01 | −7.344E−02 |

| Surface Number | S8 | S9 | S10 | S11 | S12 | S13 | S14 |
|---|---|---|---|---|---|---|---|
| K | −7.808E+00 | 6.502E+00 | −3.128E+00 | 7.391E+01 | −7.154E+00 | 6.746E+00 | −2.116E+00 |
| A4 | −6.460E−02 | 3.112E−02 | −3.724E−02 | −7.883E−02 | −6.528E−02 | 2.207E−02 | −1.812E−01 |
| A6 | 9.726E−02 | 9.071E−03 | 4.264E−02 | 1.865E−01 | 2.009E−01 | −1.145E−01 | 9.011E−02 |
| A8 | −1.841E−01 | −2.563E−02 | −6.364E−02 | −1.922E−01 | −2.047E−01 | 8.754E−02 | −3.088E−02 |
| A10 | 2.443E−01 | 5.116E−02 | 3.930E−02 | 9.562E−02 | 1.069E−01 | −3.208E−02 | 7.692E−03 |
| A12 | −2.107E−01 | −6.531E−02 | −2.987E−03 | −2.796E−02 | −3.287E−02 | 6.843E−03 | −1.413E−03 |
| A14 | 1.151E−01 | 5.140E−02 | −9.840E−03 | 4.415E−03 | 6.233E−03 | −8.951E−04 | 1.842E−04 |
| A16 | −3.868E−02 | −2.361E−02 | 5.860E−03 | −2.318E−04 | −7.196E−04 | 7.065E−05 | −1.586E−05 |
| A18 | 7.430E−03 | 5.796E−03 | −1.367E−03 | −9.689E−06 | 4.655E−05 | −3.073E−06 | 7.965E−07 |
| A20 | −6.464E−04 | −5.897E−04 | 1.163E−04 | −2.128E−07 | −1.297E−06 | 5.589E−08 | −1.750E−08 | from the diagram that the image distortion caused by the main beam is small, and the imaging quality of the system is excellent.

Second Embodiment

Figure 3:
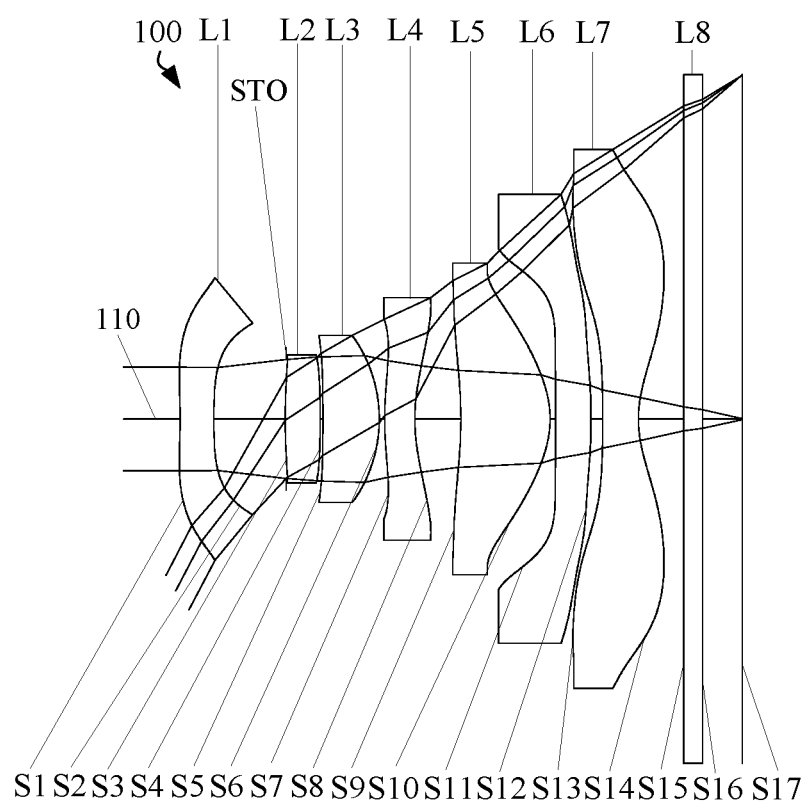
FIG. 3 is a schematic view of an optical system according to a second embodiment of the present disclosure.
Figure 4:
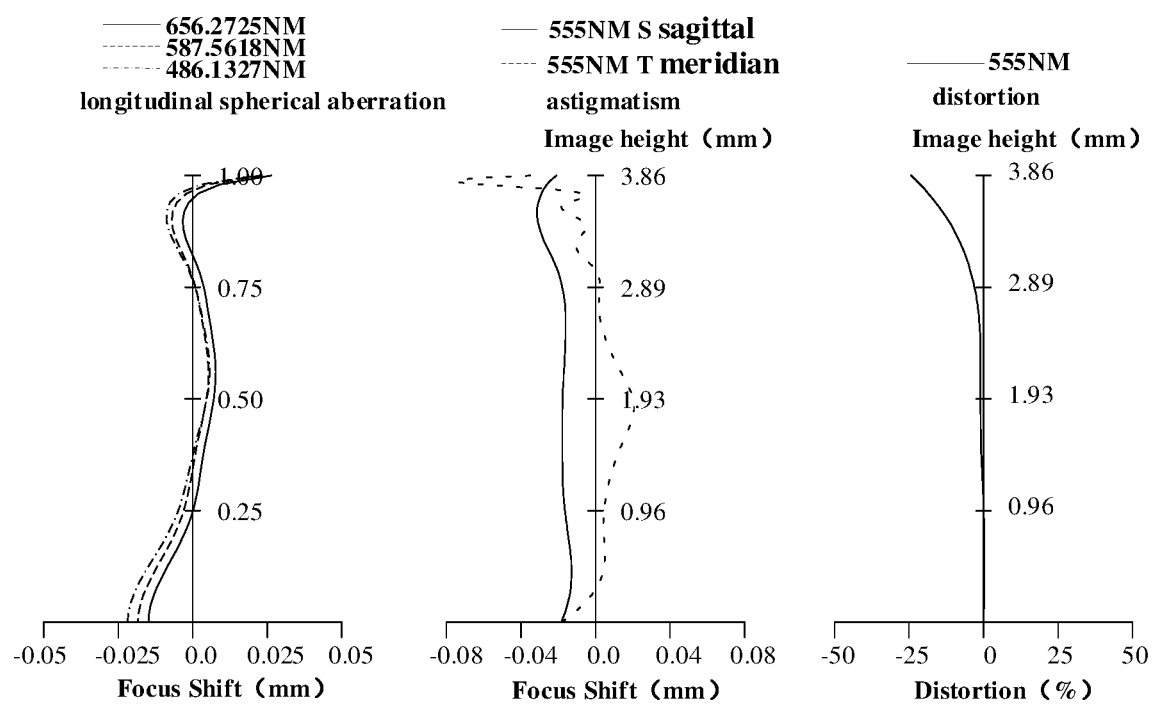
FIG. 4 is a graph showing longitudinal spherical aberration, astigmatism, and distortion of the optical system of FIG. 3.

Referring to FIGS. 3 and 4, FIG. 3 is a schematic view of an optical system 100 according to a second embodiment. The optical system 100 includes, successively in order from an object side to an image side, a first lens L1 having a negative refractive power, a stop STO, a second lens L2 having a positive refractive power, a third lens L3 having a positive refractive power, a fourth lens L4 having a negative refractive power, a fifth lens L5 having a positive refractive power, a sixth lens L6 having a positive refractive power, and a seventh lens L7 having a negative refractive power. FIG. 4 is a graph showing longitudinal spherical aberration, astigmatism, and distortion of the optical system 100 according to the second embodiment in order from left to right.

An object side surface S1 of the first lens L1 is concave near an optical axis 110 and convex at a circumference thereof.

An image side surface S2 of the first lens L1 is concave near the optical axis 110 and concave at the circumference thereof.

An object side surface S3 of the second lens L2 is convex near the optical axis 110 and convex at a circumference thereof.

An image side surface S4 of the second lens L2 is convex near the optical axis 110 and convex at the circumference thereof.

An object side surface S5 of the third lens L3 is concave near the optical axis 110 and concave at a circumference thereof.

An image side surface S6 of the third lens L3 is convex near the optical axis 110 and convex at the circumference thereof.

An object side surface S7 of the fourth lens L4 is convex near the optical axis 110 and concave at a circumference thereof.

An image side surface S8 of the fourth lens L4 is concave near the optical axis 110 and convex at the circumference thereof.

An object side surface S9 of the fifth lens L5 is concave near the optical axis 110 and convex at a circumference thereof.

An image side surface S10 of the fifth lens L5 is convex near the optical axis 110 and convex at the circumference thereof.

An object side surface S11 of the sixth lens L6 is convex near the optical axis 110 and concave at a circumference thereof.

An image side surface S12 of the sixth lens L6 is convex near the optical axis 110 and convex at the circumference thereof.

An object side surface S13 of the seventh lens L7 is concave near the optical axis 110 and convex at a circumference thereof.

An image side surface S14 of the seventh lens L7 is concave near the optical axis 110 and convex at the circumference thereof.

The object side surfaces and the image side surfaces of the first lens L1, the second lens L2, the third lens L3, the fourth lens L4, the fifth lens L5, the sixth lens L6, and the seventh lens L7 are all aspherical.

The first lens L1, the second lens L2, the third lens L3, the fourth lens L4, the fifth lens L5, the sixth lens L6, and the seventh lens L7 are all made of plastic.

In addition, various parameters of the optical system 100 are shown in Table 3, and the definition of each of the parameters can be obtained from the first embodiment, which will not be repeated herein.

TABLE 3

Second Embodiment
f = 2.65, FNO = 2.28, HFOV = 62.4 deg, TTL = 6.295 mm

| Surface Number | Surface Name Object Surface | Surface Shape Spherical | Y radius (mm) Infinite | Thickness (mm) Infinite | Material | Refractive index | Abbe number | Focal Length (mm) |
|---|---|---|---|---|---|---|---|---|
| S1 | First | Aspherical | −6.378 | 0.379 | Plastic | 1.544 | 56.11 | −7.417 |
| S2 | Lens | Aspherical | 11.220 | 0.808 | | | | |
| STO | Stop | Spherical | Infinite | −0.010 | | | | |
| S3 | Second | Aspherical | 6.434 | 0.393 | Plastic | 1.535 | 55.79 | 7.000 |
| S4 | Lens | Aspherical | −8.769 | 0.030 | | | | |
| S5 | Third | Aspherical | −13.594 | 0.630 | Plastic | 1.535 | 55.79 | 3.497 |
| S6 | Lens | Aspherical | −1.671 | 0.060 | | | | |
| S7 | Fourth | Aspherical | 3.234 | 0.338 | Plastic | 1.661 | 20.38 | −8.981 |
| S8 | Lens | Aspherical | 2.006 | 0.516 | | | | |
| S9 | Fifth | Aspherical | −4.816 | 1.000 | Plastic | 1.544 | 56.11 | 2.423 |
| S10 | Lens | Aspherical | −1.111 | 0.060 | | | | |
| S11 | Sixth | Aspherical | 236.747 | 0.398 | Plastic | 1.660 | 20.40 | 9.859 |
| S12 | Lens | Aspherical | −6.686 | 0.131 | | | | |
| S13 | Seventh | Aspherical | −15.061 | 0.400 | Plastic | 1.645 | 21.60 | −1.882 |
| S14 | Lens | Aspherical | 1.334 | 0.508 | | | | |
| S15 | Infrared | Spherical | Infinite | 0.210 | Glass | 1.517 | 64.17 | |
| S16 | Filter | Spherical | Infinite | 0.444 | | | | |
| S17 | Image Surface | Spherical | Infinite | 0.000 | | | | |

Further, the aspheric coefficients of the image side surface or the object side surface of the lenses of the optical system 100 are shown in Table 4, and the definition of each of the parameters can be obtained from the first embodiment, and will not be repeated herein.

TABLE 4

Second Embodiment
Aspheric Coefficient

| Surface Number | S1 | S2 | S3 | S4 | S5 | S6 | S7 |
|---|---|---|---|---|---|---|---|
| K | −1.486E+01 | 2.869E+01 | −1.898E+01 | 9.370E+01 | 9.900E+01 | −2.322E+00 | 5.866E+00 |
| A4 | 2.047E−01 | 2.931E−01 | −5.049E−02 | 7.693E−02 | 1.062E−01 | −1.585E−01 | −2.219E−01 |
| A6 | −1.494E−01 | −1.581E−01 | 9.814E−01 | −2.522E−01 | −2.090E−01 | 4.439E−01 | 4.196E−01 |
| A8 | 1.383E−01 | 2.434E−01 | −1.426E+01 | −8.445E−01 | −1.084E+00 | −1.456E+00 | −1.029E+00 |
| A10 | −1.124E−01 | −8.271E−02 | 1.124E+02 | 8.151E+00 | 8.043E+00 | 3.594E+00 | 1.871E+00 |
| A12 | 7.142E−02 | −7.485E−01 | −5.443E+02 | −3.453E+01 | −2.764E+01 | −6.453E+00 | −2.278E+00 |
| A14 | −3.186E−02 | 2.218E+00 | 1.639E+03 | 8.396E+01 | 5.543E+01 | 7.903E+00 | 1.762E+00 |
| A16 | 9.288E−03 | −2.768E+00 | −2.996E+03 | −1.188E+02 | −6.493E+01 | 6.194E+00 | −8.188E−01 |
| A18 | −1.641E−03 | 1.704E+00 | 3.049E+03 | 9.197E+01 | 4.148E+01 | 2.765E+00 | 2.007E−01 |
| A20 | 1.341E−04 | −4.281E−01 | −1.327E+03 | −3.029E+01 | −1.126E+01 | −5.278E−01 | −1.888E−02 |

| Surface Number | S8 | S9 | S10 | S11 | S12 | S13 | S14 |
|---|---|---|---|---|---|---|---|
| K | −7.378E+00 | 6.552E+00 | −3.662E+00 | 9.900E+01 | −1.455E+01 | 8.385E+00 | 1.902E+00 |
| A4 | −5.752E−02 | 4.838E−02 | −5.291E−02 | −5.373E−02 | −5.965E−02 | 9.092E−03 | −1.779E−01 |
| A6 | 4.796E−02 | 2.969E−02 | 7.900E−02 | 1.595E−01 | 2.095E−01 | −9.143E−02 | 7.421E−02 |
| A8 | −8.428E−02 | −9.587E−02 | −1.280E−01 | −2.163E−01 | −2.254E−01 | 7.182E−02 | −1.778E−02 |
| A10 | 1.262E−01 | 1.554E−01 | 1.250E−01 | 1.644E−01 | 1.272E−01 | −2.653E−02 | 1.826E−03 |
| A12 | −1.228E−01 | −1.600E−01 | −7.114E−02 | −9.304E−02 | −3.910E−02 | 5.700E−03 | 1.750E−04 |
| A14 | 7.332E−02 | 1.044E−01 | 2.308E−02 | 3.817E−02 | 7.663E−03 | −7.513E−04 | −8.119E−05 |
| A16 | −2.679E−02 | −4.140E−02 | −3.616E−03 | −1.029E−02 | −9.127E−04 | 5.975E−05 | 1.075E−05 |
| A18 | 5.594E−03 | 9.090E−03 | 1.222E−04 | 1.595E−03 | 6.081E−05 | −2.614E−06 | −6.598E−07 |
| A20 | −5.243E−04 | −8.479E−04 | 1.820E−05 | −1.062E−04 | −1.743E−06 | 4.761E−08 | 1.579E−08 |

According to the information of parameters described above, the following data can be derived.

| | | | |
|---|---|---|---|
| $100/(f2*\|f1\|)(mm^{-2})$ | 1.925 | $CT6/\|SAG61\|$ | 0.637 |
| $\tan(HFOV)/ImgH(mm^{-1})$ | 0.496 | $f7/R14$ | −1.409 |
| $f6/f7$ | −5.245 | $R9/R10$ | 4.335 |
| $f/f5$ | 1.095 | $\|R5/R6\|/f3(mm^{-1})$ | 2.324 |
| $(R13 + R14)/R14$ | −10.290 | | |

In addition, it can be seen from the aberration diagram in FIG. 4 that the longitudinal spherical aberration, astigmatism, and distortion of the optical system 100 are well controlled, such that the optical system 100 of this embodiment has good imaging quality.

Third Embodiment

Figure 5:
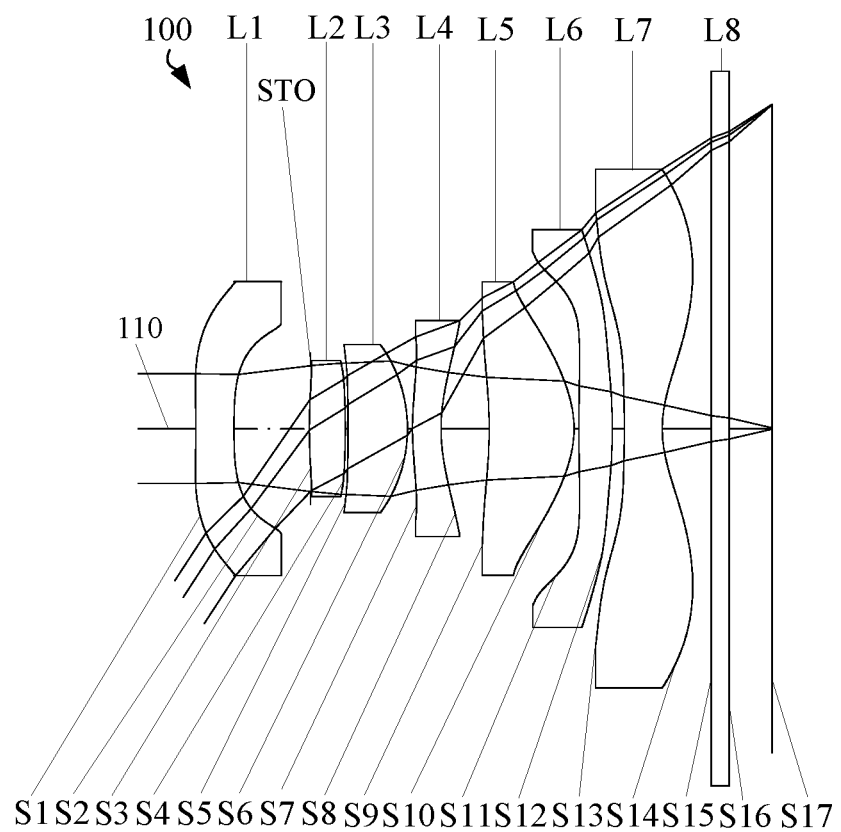
FIG. 5 is a schematic view of an optical system according to a third embodiment of the present disclosure.
Figure 6:
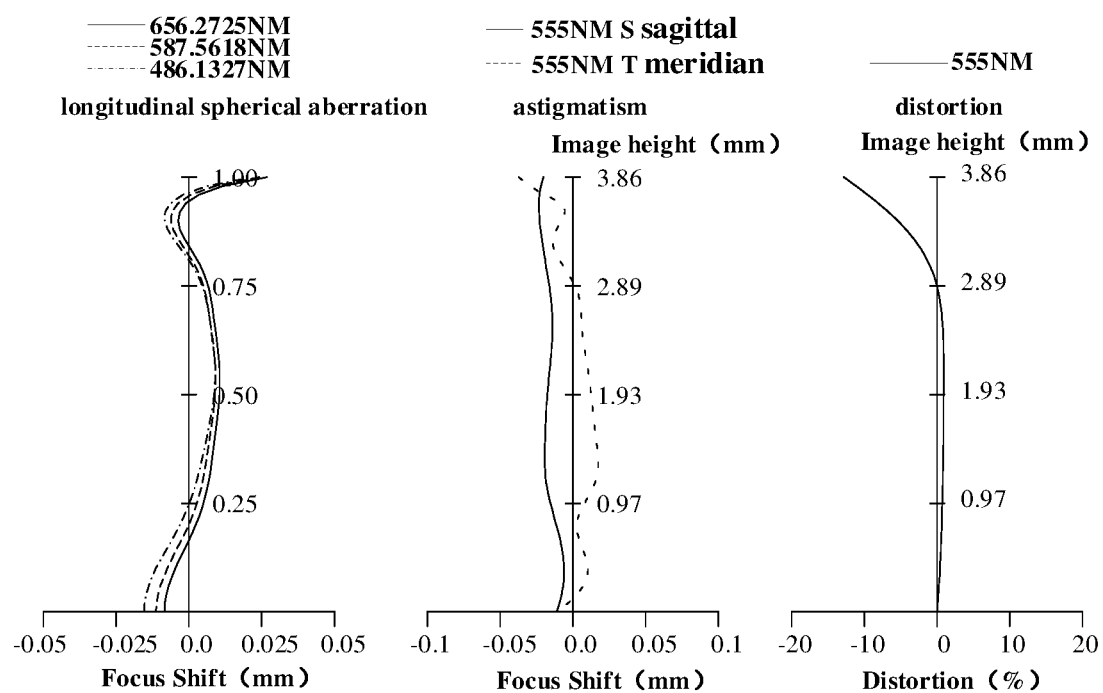
FIG. 6 is a graph showing longitudinal spherical aberration, astigmatism, and distortion of the optical system of FIG. 5.

Referring to FIGS. 5 and 6, FIG. 5 is a schematic view of an optical system 100 according to a third embodiment. The optical system 100 includes, successively in order from an object side to an image side, a first lens L1 having a negative refractive power, a stop STO, a second lens L2 having a positive refractive power, a third lens L3 having a positive refractive power, a fourth lens L4 having a negative refractive power, a fifth lens L5 having a positive refractive power, a sixth lens L6 having a positive refractive power, and a seventh lens L7 having a negative refractive power. FIG. 6 is a graph showing longitudinal spherical aberration, astigmatism, and distortion of the optical system 100 according to the third embodiment in order from left to right.

An object side surface S1 of the first lens L1 is concave near an optical axis 110 and convex at a circumference thereof.

An image side surface S2 of the first lens L1 is concave near the optical axis 110 and concave at the circumference thereof.

An object side surface S3 of the second lens L2 is convex near the optical axis 110 and concave at the circumference thereof.

An image side surface S4 of the second lens L2 is convex near the optical axis 110 and convex at the circumference thereof.

An object side surface S5 of the third lens L3 is concave near the optical axis 110 and concave at a circumference thereof.

An image side surface S6 of the third lens L3 is convex near the optical axis 110 and convex at the circumference thereof.

An object side surface S7 of the fourth lens L4 is convex near the optical axis 110 and concave at a circumference thereof.

An image side surface S8 of the fourth lens L4 is concave near the optical axis 110 and concave at the circumference thereof.

An object side surface S9 of the fifth lens L5 is concave near the optical axis 110 and concave at a circumference thereof.

An image side surface S10 of the fifth lens L5 is convex near the optical axis 110 and convex at the circumference thereof.

An object side surface S11 of the sixth lens L6 is convex near the optical axis 110 and concave at a circumference thereof.

An image side surface S12 of the sixth lens L6 is convex near the optical axis 110 and convex at the circumference thereof.

An object side surface S13 of the seventh lens L7 is concave near the optical axis 110 and concave at a circumference thereof.

An image side surface S14 of the seventh lens L7 is concave near the optical axis 110 and convex at the circumference thereof.

The object side surfaces and the image side surfaces of the first lens L1, the second lens L2, the third lens L3, the fourth lens L4, the fifth lens L5, the sixth lens L6, and the seventh lens L7 are all aspherical.

The first lens L1, the second lens L2, the third lens L3, the fourth lens L4, the fifth lens L5, the sixth lens L6, and the seventh lens L7 are all made of plastic.

In addition, various parameters of the optical system 100 are shown in Table 5, and the definition of each of the parameters can be obtained from the first embodiment, which will not be repeated herein.

TABLE 5

Third Embodiment
f = 2.88 mm, FNO = 2.2, HFOV = 57 deg, TTL = 6.860 mm

| Surface Number | Surface Name Object Surface | Surface Shape Spherical | Y radius (mm) Infinite | Thickness (mm) Infinite | Material | Refractive index | Abbe number | Focal Length (mm) |
|---|---|---|---|---|---|---|---|---|
| S1 | First | Aspherical | −8.663 | 0.453 | Plastic | 1.544 | 56.11 | −8.201 |
| S2 | Lens | Aspherical | 9.371 | 0.911 | | | | |
| STO | Stop | Spherical | Infinite | −0.013 | | | | |
| S3 | Second | Aspherical | 6.968 | 0.427 | Plastic | 1.535 | 55.79 | 7.671 |
| S4 | Lens | Aspherical | −9.770 | 0.033 | | | | |
| S5 | Third | Aspherical | −18.037 | 0.707 | Plastic | 1.535 | 55.79 | 3.692 |
| S6 | Lens | Aspherical | −1.805 | 0.060 | | | | |
| S7 | Fourth | Aspherical | 3.487 | 0.340 | Plastic | 1.661 | 20.38 | −8.768 |
| S8 | Lens | Aspherical | 2.092 | 0.574 | | | | |
| S9 | Fifth | Aspherical | −5.238 | 1.011 | Plastic | 1.544 | 56.11 | 2.784 |
| S10 | Lens | Aspherical | −1.255 | 0.060 | | | | |
| S11 | Sixth | Aspherical | 43.567 | 0.395 | Plastic | 1.661 | 20.38 | 9.144 |
| S12 | Lens | Aspherical | −6.990 | 0.142 | | | | |
| S13 | Seventh | Aspherical | −24.376 | 0.454 | Plastic | 1.644 | 22.75 | −2.107 |
| S14 | Lens | Aspherical | 1.447 | 0.583 | | | | |
| S15 | Infrared | Spherical | Infinite | 0.210 | Glass | 1.517 | 64.17 | |
| S16 | Filter | Spherical | Infinite | 0.512 | | | | |
| S17 | Image Surface | Spherical | Infinite | 0.000 | | | | |

Further, the aspheric coefficients of the image side surface or the object side surface of the lenses of the optical system 100 are shown in Table 6, and the definition of each of the parameters can be obtained from the first embodiment, and will not be repeated herein.

TABLE 6

Third Embodiment
Aspheric Coefficient

| Surface Number | S1 | S2 | S3 | S4 | S5 | S6 | S7 |
|---|---|---|---|---|---|---|---|
| K | −1.642E+01 | 3.391E+01 | −2.063E+01 | 8.934E+01 | 9.900E+01 | −2.211E+00 | −4.988E+00 |
| A4 | 1.492E−01 | 1.963E−01 | −4.239E−02 | 4.431E−02 | 5.755E−02 | −1.191E−01 | −1.622E−01 |
| A6 | −9.846E−02 | 3.038E−02 | 7.903E−01 | 4.072E−02 | −5.790E−02 | 2.539E−01 | 2.368E−01 |
| A8 | 8.568E−02 | −4.703E−01 | −9.647E+00 | −2.225E+00 | −1.078E+00 | −7.368E−01 | −5.073E−01 |
| A10 | −6.497E−02 | 1.527E+00 | 6.347E+01 | 1.110E+01 | 4.885E+00 | 1.694E+00 | 9.128E−01 |
| A12 | 3.811E−02 | −2.763E+00 | −2.535E+02 | −3.027E+01 | −1.078E+01 | −2.844E+00 | −1.167E+00 |
| A14 | −1.556E−02 | 3.153E+00 | 6.242E+02 | 5.009E+01 | 1.365E+01 | 3.240E+00 | 9.985E−01 |
| A16 | 4.076E−03 | −2.211E+00 | −9.273E+02 | −5.061E+01 | −1.004E+01 | −2.358E+00 | −5.455E−01 |
| A18 | −6.145E−04 | 8.731E−01 | 7.626E+02 | 2.915E+01 | 4.120E+00 | 9.754E−01 | 1.712E−01 |
| A20 | 4.019E−05 | −1.494E−01 | −2.668E+02 | −7.400E+00 | −7.708E−01 | −1.724E−01 | −2.344E−02 |

| Surface Number | S8 | S9 | S10 | S11 | S12 | S13 | S14 |
|---|---|---|---|---|---|---|---|
| K | −6.251E+00 | 6.572E+00 | −3.937E+00 | 9.900E+01 | −1.104E+01 | 2.707E+01 | −1.934E+00 |
| A4 | −2.852E−02 | 4.050E−02 | −1.935E−02 | −1.985E−02 | −4.112E−02 | 7.503E−03 | −1.171E−01 |
| A6 | −3.305E−02 | 3.137E−02 | −1.764E−02 | 3.707E−02 | 1.110E−01 | −5.298E−02 | 3.570E−02 |
| A8 | 1.006E−01 | −1.080E−01 | 3.659E−02 | −3.986E−02 | −9.796E−02 | 3.057E−02 | −3.951E−03 |
| A10 | −1.273E−01 | 1.688E−01 | −4.383E−02 | 2.259E−02 | 4.497E−02 | −6.792E−03 | −1.205E−03 |
| A12 | 9.476E−02 | −1.550E−01 | 3.375E−02 | −1.276E−02 | −1.251E−02 | 2.504E−04 | 5.595E−04 |
| A14 | −4.298E−02 | 8.755E−02 | −1.527E−02 | 5.771E−03 | 2.221E−03 | 1.835E−04 | −1.009E−04 |
| A16 | 1.077E−02 | −3.001E−02 | 3.923E−03 | −1.610E−03 | −2.486E−04 | −3.949E−05 | 9.741E−06 |
| A18 | −1.080E−03 | 5.746E−03 | −5.209E−04 | 2.409E−04 | 1.611E−05 | 3.398E−06 | −4.945E−07 |
| A20 | −2.254E−05 | −4.721E−04 | 2.713E−05 | −1.472E−05 | −4.613E−07 | −1.120E−07 | 1.037E−08 |

In addition, according to the information of parameters described above, the following data can be derived.

| | | | |
|---|---|---|---|
| $100/(f2\ast\|f1\|)(mm^{-2})$ | 1.590 | CT6/\|SAG61\| | 0.813 |
| tan(HFOV)/ImgH($mm^{-1}$) | 0.399 | f7/R14 | −1.458 |
| f6/f7 | −4.332 | R9/R10 | 4.174 |
| f/f5 | 1.036 | \|R5/R6\|/f3($mm^{-1}$) | 2.708 |
| (R13 + R14)/R14 | −15.846 | | |

In addition, it can be seen from the aberration diagram in FIG. 6 that the longitudinal spherical aberration, astigmatism, and distortion of the optical system 100 are well controlled, such that the optical system 100 of this embodiment has good imaging quality.

Fourth Embodiment

Figure 7:
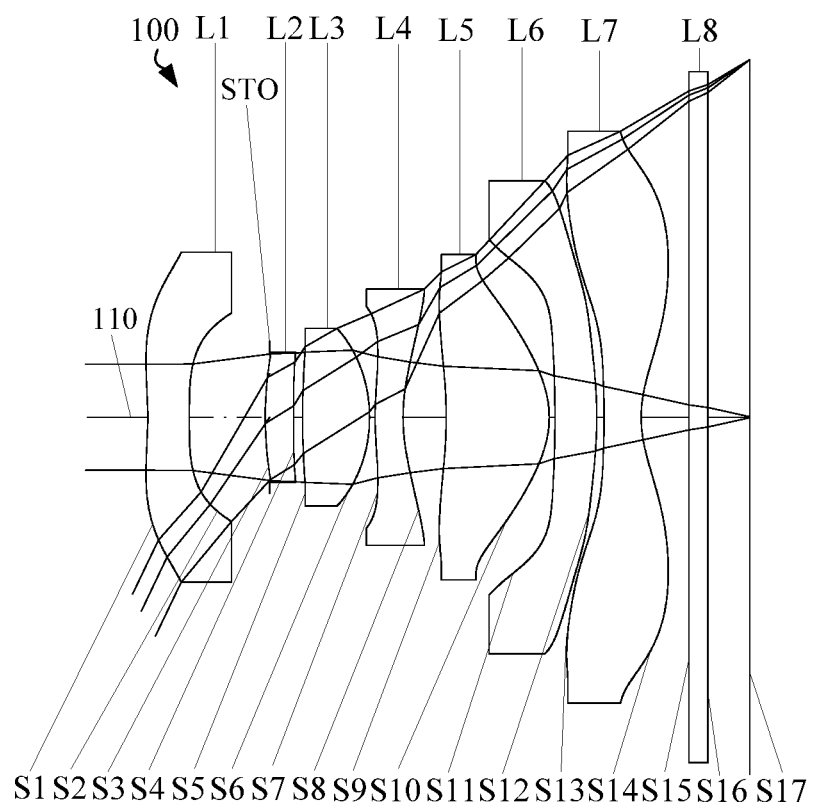
FIG. 7 is a schematic view of an optical system according to a fourth embodiment of the present disclosure.
Figure 8:
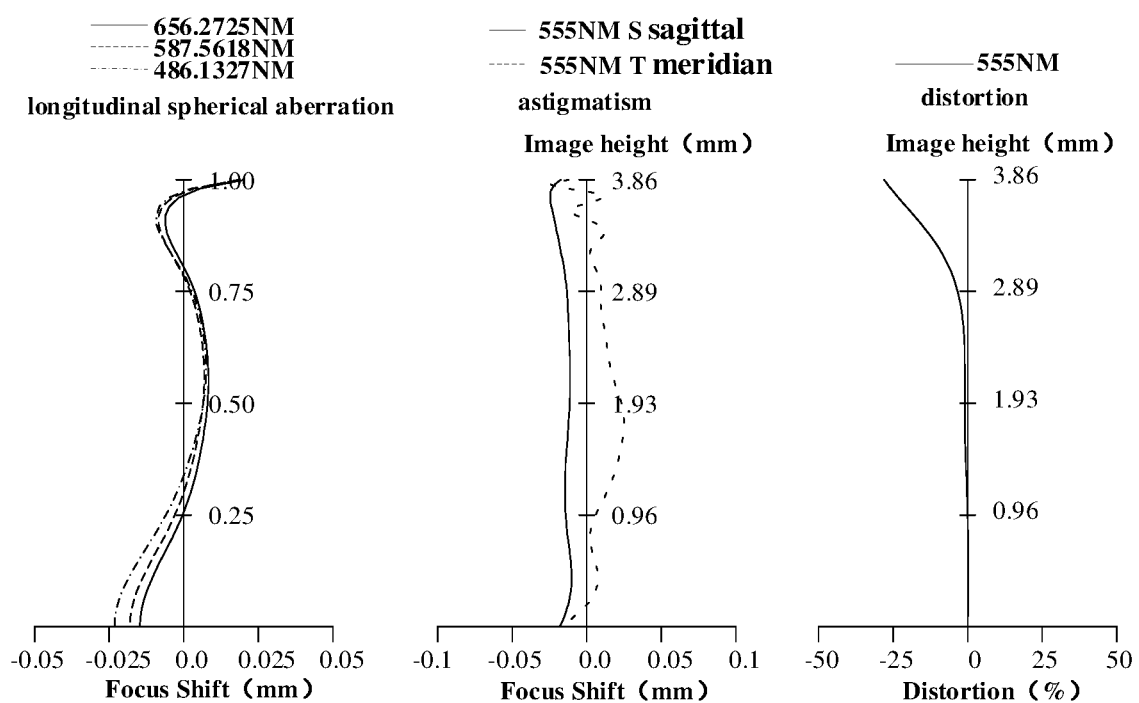
FIG. 8 is a graph showing longitudinal spherical aberration, astigmatism, and distortion of the optical system of FIG. 7.

Referring to FIGS. 7 and 8, FIG. 7 is a schematic view of an optical system 100 according to a fourth embodiment. The optical system 100 includes, successively in order from an object side to an image side, a first lens L1 having a negative refractive power, a stop STO, a second lens L2 having a positive refractive power, a third lens L3 having a positive refractive power, a fourth lens L4 having a negative refractive power, a fifth lens L5 having a positive refractive power, a sixth lens L6 having a positive refractive power, and a seventh lens L7 having a negative refractive power. FIG. 8 is a graph showing longitudinal spherical aberration, astigmatism, and distortion of the optical system 100 according to the fourth embodiment in order from left to right.

An object side surface S1 of the first lens L1 is concave near an optical axis 110 and convex at a circumference thereof.

An image side surface S2 of the first lens L1 is concave near the optical axis 110 and concave at the circumference thereof.

An object side surface S3 of the second lens L2 is convex near the optical axis 110 and convex at a circumference thereof.

An image side surface S4 of the second lens L2 is concave near the optical axis 110 and concave at the circumference thereof.

An object side surface S5 of the third lens L3 is convex near the optical axis 110 and concave at a circumference thereof.

An image side surface S6 of the third lens L3 is convex near the optical axis 110 and convex at the circumference thereof.

An object side surface S7 of the fourth lens L4 is convex near the optical axis 110 and concave at a circumference thereof.

An image side surface S8 of the fourth lens L4 is concave near the optical axis 110 and concave at the circumference thereof.

An object side surface S9 of the fifth lens L5 is concave near the optical axis 110 and convex at a circumference thereof.

An image side surface S10 of the fifth lens L5 is convex near the optical axis 110 and convex at the circumference thereof.

An object side surface S11 of the sixth lens L6 is concave near the optical axis 110 and concave at the circumference thereof.

An image side surface S12 of the sixth lens L6 is convex near the optical axis 110 and convex at the circumference thereof.

An object side surface S13 of the seventh lens L7 is concave near the optical axis 110 and convex at a circumference thereof.

An image side surface S14 of the seventh lens L7 is concave near the optical axis 110 and convex at the circumference thereof.

The object side surfaces and the image side surfaces of the first lens L1, the second lens L2, the third lens L3, the fourth lens L4, the fifth lens L5, the sixth lens L6, and the seventh lens L7 are all aspherical.

The first lens L1, the second lens L2, the third lens L3, the fourth lens L4, the fifth lens L5, the sixth lens L6, and the seventh lens L7 are all made of plastic.

In addition, various parameters of the optical system 100 are shown in Table 7, and the definition of each of the parameters can be obtained from the first embodiment, which will not be repeated herein.

TABLE 7

Fourth Embodiment
f = 2.57 mm, FNO = 2.25, HFOV = 64.4 deg, TTL = 6.487 mm

| Surface Number | Surface Name Object Surface | Surface Shape Spherical | Y radius (mm) Infinite | Thickness (mm) Infinite | Material | Refractive index | Abbe number | Focal Length (mm) |
|---|---|---|---|---|---|---|---|---|
| S1 | First | Aspherical | −4.490 | 0.447 | Plastic | 1.544 | 56.11 | −6.066 |
| S2 | Lens | Aspherical | 12.891 | 0.866 | | | | |
| STO | Stop | Spherical | Infinite | −0.046 | | | | |
| S3 | Second | Aspherical | 4.225 | 0.302 | Plastic | 1.567 | 37.40 | 9.594 |
| S4 | Lens | Aspherical | 18.409 | 0.100 | | | | |
| S5 | Third | Aspherical | 11.081 | 0.720 | Plastic | 1.535 | 55.75 | 2.742 |
| S6 | Lens | Aspherical | −1.653 | 0.060 | | | | |
| S7 | Fourth | Aspherical | 3.308 | 0.300 | Plastic | 1.661 | 20.38 | −7.449 |
| S8 | Lens | Aspherical | 1.907 | 0.465 | | | | |
| S9 | Fifth | Aspherical | −4.561 | 1.110 | Plastic | 1.544 | 56.11 | 2.193 |
| S10 | Lens | Aspherical | −1.027 | 0.060 | | | | |
| S11 | Sixth | Aspherical | −19.281 | 0.450 | Plastic | 1.635 | 23.90 | 11.997 |
| S12 | Lens | Aspherical | −5.510 | 0.079 | | | | |
| S13 | Seventh | Aspherical | −12.368 | 0.400 | Plastic | 1.635 | 23.90 | −1.827 |
| S14 | Lens | Aspherical | 1.296 | 0.514 | | | | |
| S15 | Infrared | Spherical | Infinite | 0.210 | Glass | 1.517 | 64.17 | |

TABLE 7-continued

Fourth Embodiment
f = 2.57 mm, FNO = 2.25, HFOV = 64.4 deg, TTL = 6.487 mm

| Surface Number | Surface Name Object Surface | Surface Shape Spherical | Y radius (mm) Infinite | Thickness (mm) Infinite | Material | Refractive index | Abbe number | Focal Length (mm) |
|---|---|---|---|---|---|---|---|---|
| S16 | Filter | Spherical | Infinite | 0.451 | | | | |
| S17 | Image Surface | Spherical | Infinite | 0.000 | | | | |

Further, the aspheric coefficients of the image side surface or the object side surface of the lenses of the optical system 100 are shown in Table 8, and the definition of each of the parameters can be obtained from the first embodiment, and will not be repeated herein.

TABLE 8

Fourth Embodiment
Aspheric Coefficient

| Surface Number | S1 | S2 | S3 | S4 | S5 | S6 | S7 |
|---|---|---|---|---|---|---|---|
| K   | −4.225E−01 | −8.229E+01 | 1.224E+01  | 0.000E+00  | 0.000E+00  | −1.997E+00 | −1.074E+01 |
| A4  | 2.119E−01  | 2.950E−01  | −6.014E−03 | 5.981E−02  | 3.440E−02  | −2.184E−01 | −2.857E−01 |
| A6  | −1.566E−01 | −1.283E−01 | 3.406E−01  | −2.178E−02 | −6.861E−02 | 5.169E−01  | 6.316E−01  |
| A8  | 1.254E−01  | 3.982E−02  | −4.954E+00 | −2.145E−01 | 1.024E−01  | −8.238E−01 | −1.555E+00 |
| A10 | −8.158E−02 | 2.891E−01  | 3.730E+01  | 1.364E+00  | −2.604E−01 | −5.978E−01 | 2.850E+00  |
| A12 | 3.890E−02  | −7.169E−01 | −1.747E+02 | −5.239E+00 | 5.302E−01  | 5.638E+00  | −3.633E+00 |
| A14 | −1.259E−02 | 9.568E−01  | 5.100E+02  | 1.215E+01  | −5.502E−01 | −1.203E+01 | 3.088E+00  |
| A16 | 2.523E−03  | −7.157E−01 | −9.057E+02 | −1.781E+01 | −3.142E−01 | 1.310E+01  | −1.664E+00 |
| A18 | −2.780E−04 | 2.757E−01  | 8.961E+02  | 1.558E+01  | 1.089E+00  | −7.474E+00 | 5.068E−01  |
| A20 | 1.286E−05  | −4.354E−02 | −3.793E+02 | −6.129E+00 | −5.516E−01 | 1.777E+00  | −6.518E−02 |

| Surface Number | S8 | S9 | S10 | S11 | S12 | S13 | S14 |
|---|---|---|---|---|---|---|---|
| K   | −7.078E+00 | 3.942E+00  | −3.242E+00 | −5.517E+01 | −5.691E+00 | 7.602E+00  | −2.156E+00 |
| A4  | −6.175E−02 | 4.561E−02  | −4.458E−02 | −5.249E−02 | −4.774E−02 | 1.850E−02  | −1.876E−01 |
| A6  | 7.072E−02  | 1.387E−02  | −1.087E−02 | 9.308E−03  | 1.572E−01  | −1.080E−01 | 9.791E−02  |
| A8  | −1.049E−01 | −1.662E−02 | 1.224E−01  | −4.396E−02 | −1.661E−01 | 8.311E−02  | −3.553E−02 |
| A10 | 1.387E−01  | 1.945E−02  | −2.258E−01 | −4.712E−02 | 8.831E−02  | −3.055E−02 | 9.301E−03  |
| A12 | −1.260E−01 | −2.925E−02 | 2.159E−01  | 5.876E−02  | −2.733E−02 | 6.523E−03  | −1.752E−03 |
| A14 | 7.372E−02  | 2.607E−02  | −1.197E−01 | −2.825E−02 | 5.165E−03  | −8.520E−04 | 2.288E−04  |
| A16 | −2.743E−02 | −1.215E−02 | 3.872E−02  | 7.097E−03  | −5.898E−04 | 6.716E−05  | −1.948E−05 |
| A18 | 5.972E−03  | 2.851E−03  | −6.725E−03 | −8.980E−04 | 3.753E−05  | −2.931E−06 | 9.667E−07  |
| A20 | −5.830E−04 | −2.707E−04 | 4.822E−04  | 4.403E−05  | −1.026E−06 | 5.417E−08  | −2.106E−08 |

In addition, according to the information of parameters described above, the following data can be derived.

| | | | |
|---|---|---|---|
| $100/(f2*|f1|)(mm^{-2})$ | 1.718 | CT6/|SAG61| | 0.639 |
| $\tan(HFOV)/ImgH(mm^{-1})$ | 0.541 | f7/R14 | −1.412 |
| f6/f7 | −6.557 | R9/R10 | 4.441 |
| f/f5 | 1.174 | $|R5/R6|/f3(mm^{-1})$ | 2.447 |
| (R13 + R14)/R14 | −8.543 | | |

In addition, it can be seen from the aberration diagram in FIG. 8 that the longitudinal spherical aberration, astigmatism, and distortion of the optical system 100 are well controlled, such that the optical system 100 of this embodiment has good imaging quality.

Fifth Embodiment

Figure 9:
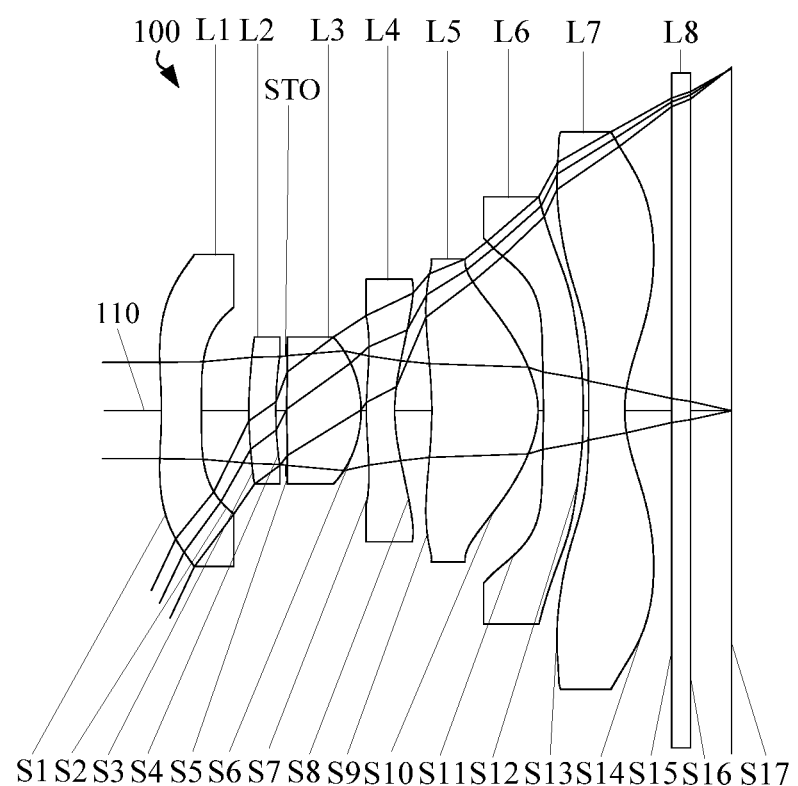
FIG. 9 is a schematic view of an optical system according to a fifth embodiment of the present disclosure.
Figure 10:
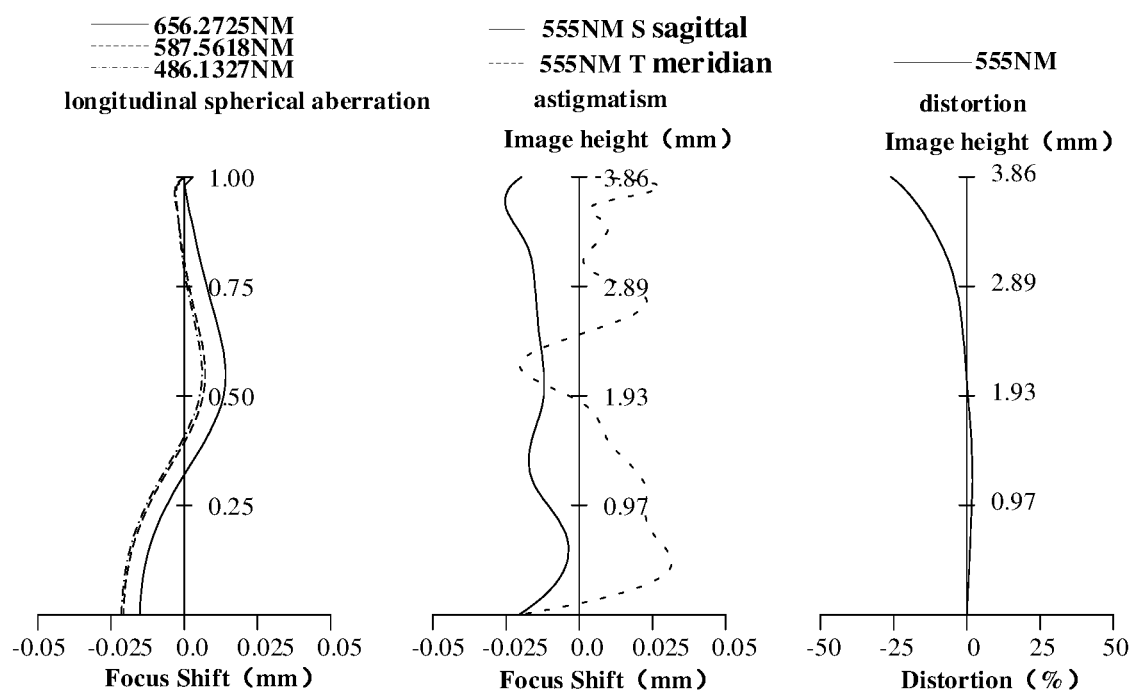
FIG. 10 is a graph showing longitudinal spherical aberration, astigmatism, and distortion of the optical system of FIG. 9.

Referring to FIGS. 9 and 10, FIG. 9 is a schematic view of an optical system 100 according to a fifth embodiment. The optical system 100 includes, successively in order from an object side to an image side, a first lens L1 having a negative refractive power, a second lens L2 having a negative refractive power, a stop STO, a third lens L3 having a positive refractive power, a fourth lens L4 having a negative refractive power, a fifth lens L5 having a positive refractive power, a sixth lens L6 having a positive refractive power, and a seventh lens L7 having a negative refractive power.

FIG. 10 is a graph showing longitudinal spherical aberration, astigmatism, and distortion of the optical system 100 according to the fifth embodiment in order from left to right.

An object side surface S1 of the first lens L1 is concave near an optical axis 110 and convex at a circumference thereof.

An image side surface S2 of the first lens L1 is convex near the optical axis 110 and concave at the circumference thereof.

An object side surface S3 of the second lens L2 is convex near the optical axis 110 and convex at a circumference thereof.

An image side surface S4 of the second lens L2 is concave near the optical axis 110 and concave at the circumference thereof.

An object side surface S5 of the third lens L3 is convex near the optical axis 110 and concave at a circumference thereof.

An image side surface S6 of the third lens L3 is convex near the optical axis 110 and convex at the circumference thereof.

An object side surface S7 of the fourth lens L4 is convex near the optical axis 110 and concave at a circumference thereof.

An image side surface S8 of the fourth lens L4 is concave near the optical axis 110 and concave at the circumference thereof.

An object side surface S9 of the fifth lens L5 is concave near the optical axis 110 and convex at a circumference thereof.

An image side surface S10 of the fifth lens L5 is convex near the optical axis 110 and convex at the circumference thereof.

An object side surface S11 of the sixth lens L6 is concave near the optical axis 110 and concave at a circumference thereof.

An image side surface S12 of the sixth lens L6 is convex near the optical axis 110 and convex at the circumference thereof.

An object side surface S13 of the seventh lens L7 is concave near the optical axis 110 and convex at a circumference thereof.

An image side surface S14 of the seventh lens L7 is concave near the optical axis 110 and convex at the circumference thereof.

The object side surfaces and the image side surfaces of the first lens L1, the second lens L2, the third lens L3, the fourth lens L4, the fifth lens L5, the sixth lens L6, and the seventh lens L7 are all aspherical.

The first lens L1, the second lens L2, the third lens L3, the fourth lens L4, the fifth lens L5, the sixth lens L6, and the seventh lens L7 are all made of plastic.

In addition, various parameters of the optical system 100 are shown in Table 9, and the definition of each of the parameters can be obtained from the first embodiment, which will not be repeated herein.

TABLE 9

Fifth Embodiment
f = 2.45mm, FNO = 2.25, HFOV = 64.8°, TTL = 6.407 mm

| Surface Number | Surface Name Object Surface | Surface Shape Spherical | Y radius (mm) Infinite | Thickness (mm) Infinite | Material | Refractive index | Abbe number | Focal Length (mm) |
|---|---|---|---|---|---|---|---|---|
| S1 | First | Aspherical | −4.285 | 0.448 | Plastic | 1.544 | 56.11 | −8.267 |
| S2 | Lens | Aspherical | −93.733 | 0.534 | | | | |
| S3 | Second | Aspherical | 5.000 | 0.303 | Plastic | 1.567 | 37.40 | −101.673 |
| S4 | Lens | Aspherical | 4.500 | 0.113 | | | | |
| STO | Stop | Spherical | Infinite | 0.009 | | | | |
| S5 | Third | Aspherical | 12.536 | 0.835 | Plastic | 1.535 | 55.75 | 2.280 |
| S6 | Lens | Aspherical | −1.320 | 0.060 | | | | |
| S7 | Fourth | Aspherical | 3.744 | 0.319 | Plastic | 1.661 | 20.38 | −6.638 |
| S8 | Lens | Aspherical | 1.951 | 0.416 | | | | |
| S9 | Fifth | Aspherical | −4.761 | 1.194 | Plastic | 1.544 | 56.11 | 2.045 |
| S10 | Lens | Aspherical | −0.982 | 0.060 | | | | |
| S11 | Sixth | Aspherical | −14.458 | 0.450 | Plastic | 1.635 | 23.90 | 13.395 |
| S12 | Lens | Aspherical | −5.420 | 0.060 | | | | |
| S13 | Seventh | Aspherical | −14.974 | 0.404 | Plastic | 1.635 | 23.90 | −2.072 |
| S14 | Lens | Aspherical | 1.468 | 0.527 | | | | |
| S15 | Infrared | Spherical | Infinite | 0.210 | Glass | 1.517 | 64.17 | |
| S16 | Filter | Spherical | Infinite | 0.464 | | | | |
| S17 | Image Surface | Spherical | Infinite | 0.000 | | | | |

Further, the aspheric coefficients of the image side surface or the object side surface of the lenses of the optical system 100 are shown in Table 10, and the definition of each of the parameters can be obtained from the first embodiment, and will not be repeated herein.

TABLE 10

Fifth Embodiment
Aspheric Coefficient

| Surface Number | S1 | S2 | S3 | S4 | S5 | S6 | S7 |
|---|---|---|---|---|---|---|---|
| K | −2.861E+00 | 9.900E+01 | 3.652E+00 | −2.997E+01 | 1.285E+01 | −1.560E+00 | −1.027E+01 |
| A4 | 2.125E−01 | 3.270E−01 | 4.043E−02 | 4.065E−02 | −5.140E−02 | −1.463E−01 | −1.894E−01 |
| A6 | −1.953E−01 | −5.740E−01 | −6.537E−01 | −5.074E−01 | −3.244E−01 | 2.274E−01 | 1.906E−01 |
| A8 | 2.018E−01 | 1.875E+00 | 4.178E+00 | 8.290E+00 | 4.935E+00 | −1.385E+00 | −2.766E−01 |
| A10 | −1.704E−01 | −4.739E+00 | −1.856E+01 | −7.803E+01 | −4.269E+01 | 6.100E+00 | 4.148E−01 |
| A12 | 1.058E−01 | 8.101E+00 | 5.620E+01 | 4.539E+02 | 2.135E+02 | −1.733E+01 | −5.008E−01 |
| A14 | −4.490E−02 | −8.853E+00 | −1.125E+02 | −1.637E+03 | −6.409E+02 | 2.965E+01 | 4.366E−01 |
| A16 | 1.217E−02 | 5.910E+00 | 1.417E+02 | 3.591E+03 | 1.137E+03 | −2.964E+01 | −2.638E−01 |

TABLE 10-continued

Fifth Embodiment
Aspheric Coefficient

| | | | | | | | |
|---|---|---|---|---|---|---|---|
| A18 | −1.884E−03 | −2.186E+00 | −1.011E+02 | −4.396E+03 | −1.088E+03 | 1.565E+01 | 9.731E−02 |
| A20 | 1.259E−04 | 3.413E−01 | 3.100E+01 | 2.310E+03 | 4.293E+02 | −3.269E+00 | −1.607E−02 |

| Surface Number | S8 | S9 | S10 | S11 | S12 | S13 | S14 |
|---|---|---|---|---|---|---|---|
| K | −7.827E+00 | 3.099E+00 | −1.002E+00 | −9.900E+01 | 3.516E+00 | 7.754E+00 | −2.027E+00 |
| A4 | −4.406E−02 | 3.606E−02 | 2.778E−01 | 1.424E−02 | −7.955E−02 | 1.846E−02 | −1.016E−01 |
| A6 | −2.051E−02 | 4.501E−02 | −3.820E−01 | 3.364E−02 | 1.913E−01 | −9.537E−02 | 1.436E−02 |
| A8 | 1.060E−01 | −9.141E−02 | 4.613E−01 | −7.787E−02 | −1.760E−01 | 7.093E−02 | 7.221E−03 |
| A10 | −1.737E−01 | 1.246E−01 | −4.595E−01 | 5.581E−02 | 8.397E−02 | −2.554E−02 | −4.389E−03 |
| A12 | 1.751E−01 | −1.128E−01 | 3.332E−01 | −2.963E−02 | −2.353E−02 | 5.400E−03 | 1.109E−03 |
| A14 | −1.134E−01 | 6.440E−02 | −1.576E−01 | 1.251E−02 | 4.044E−03 | −7.066E−04 | −1.596E−04 |
| A16 | 4.498E−02 | −2.218E−02 | 4.531E−02 | −3.633E−03 | −4.207E−04 | 5.656E−05 | 1.346E−05 |
| A18 | −9.899E−03 | 4.219E−03 | −7.126E−03 | 6.065E−04 | 2.439E−05 | −2.547E−06 | −6.169E−07 |
| A20 | 9.180E−04 | −3.418E−04 | 4.676E−04 | −4.269E−05 | −6.060E−07 | 4.955E−08 | 1.185E−08 |

In addition, according to the information of parameters described above, the following data can be derived.

| | | | |
|---|---|---|---|
| $100/(f2*|f1|)(mm^{-2})$ | 0.119 | CT6/|SAG61| | 0.709 |
| $\tan(HFOV)/ImgH(mm^{-1})$ | 0.551 | f7/R14 | −1.410 |
| f6/f7 | −6.473 | R9/R10 | 4.848 |
| f/f5 | 1.119 | $|R5/R6|/f3(mm^{-1})$ | 4.165 |
| (R13 + R14)/R14 | −9.200 | | |

In addition, it can be seen from the aberration diagram in FIG. 10 that the longitudinal spherical aberration, astigmatism, and distortion of the optical system 100 are well controlled, such that the optical system 100 of this embodiment has good imaging quality.

Sixth Embodiment

Figure 11:
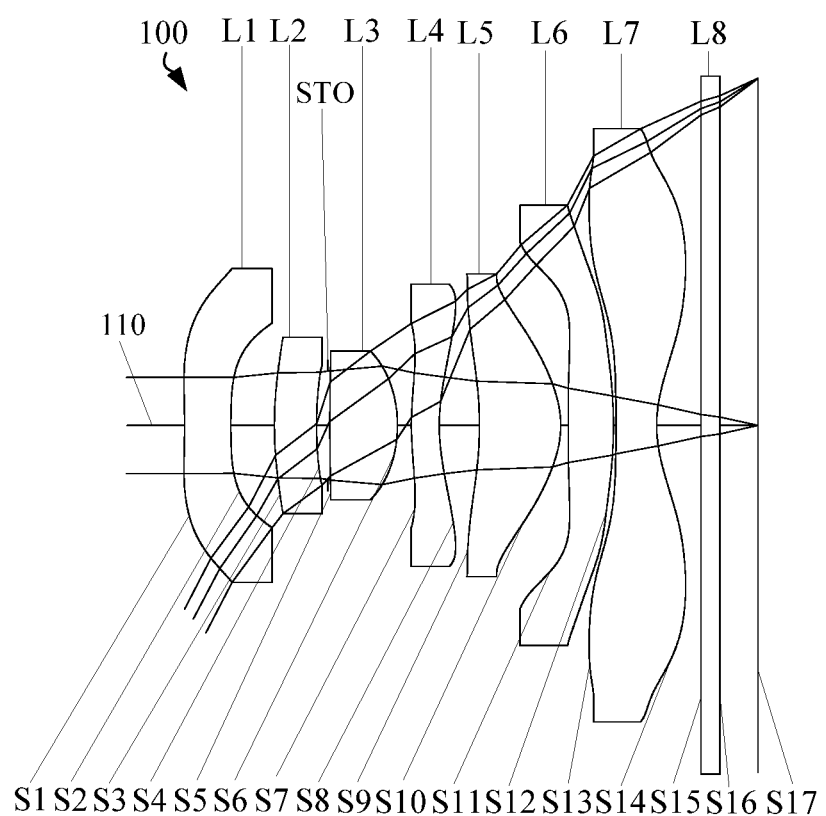
FIG. 11 is a schematic view of an optical system according to a sixth embodiment of the present disclosure.
Figure 12:
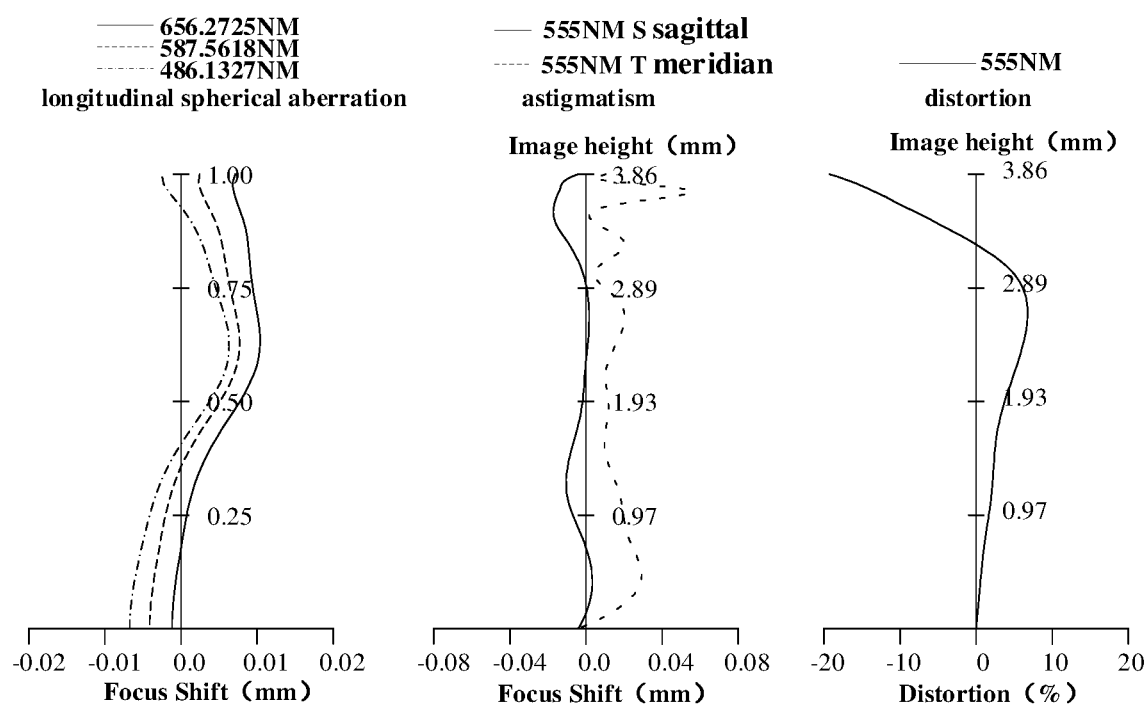
FIG. 12 is a graph showing longitudinal spherical aberration, astigmatism, and distortion of the optical system of FIG. 11.

Referring to FIGS. 11 and 12, FIG. 11 is a schematic view of an optical system 100 according to a sixth embodiment. The optical system 100 includes, successively in order from an object side to an image side, a first lens L1 having a negative refractive power, a second lens L2 having a positive refractive power, a stop STO, a third lens L3 having a positive refractive power, a fourth lens L4 having a negative refractive power, a fifth lens L5 having a positive refractive power, a sixth lens L6 having a positive refractive power, and a seventh lens L7 having a negative refractive power. FIG. 12 is a graph showing longitudinal spherical aberration, astigmatism, and distortion of the optical system 100 according to the sixth embodiment in order from left to right.

An object side surface S1 of the first lens L1 is concave near an optical axis 110 and convex at a circumference thereof.

An image side surface S2 of the first lens L1 is concave near the optical axis 110 and concave at the circumference thereof.

An object side surface S3 of the second lens L2 is convex near the optical axis 110 and convex at the circumference thereof.

An image side surface S4 of the second lens L2 is concave near the optical axis 110 and concave at the circumference thereof.

An object side surface S5 of the third lens L3 is convex near the optical axis 110 and concave at a circumference thereof.

An image side surface S6 of the third lens L3 is convex near the optical axis 110 and convex at the circumference thereof.

An object side surface S7 of the fourth lens L4 is convex near the optical axis 110 and concave at a circumference thereof.

An image side surface S8 of the fourth lens L4 is concave near the optical axis 110 and convex at the circumference thereof.

An object side surface S9 of the fifth lens L5 is concave near the optical axis 110 and concave at a circumference thereof.

An image side surface S10 of the fifth lens L5 is convex near the optical axis 110 and concave at the circumference thereof.

An object side surface S11 of the sixth lens L6 is convex near the optical axis 110 and concave at a circumference thereof.

An image side surface S12 of the sixth lens L6 is convex near the optical axis 110 and convex at the circumference thereof.

An object side surface S13 of the seventh lens L7 is concave near the optical axis 110 and convex at a circumference thereof.

An image side surface S14 of the seventh lens L7 is concave near the optical axis 110 and convex at the circumference thereof.

The object side surfaces and the image side surfaces of the first lens L1, the second lens L2, the third lens L3, the fourth lens L4, the fifth lens L5, the sixth lens L6, and the seventh lens L7 are all aspherical.

The first lens L1, the second lens L2, the third lens L3, the fourth lens L4, the fifth lens L5, the sixth lens L6, and the seventh lens L7 are all made of plastic.

In addition, various parameters of the optical system 100 are shown in Table 11, and the definition of each of the parameters can be obtained from the first embodiment, which will not be repeated herein.

TABLE 11

Sixth Embodiment
f = 2.47 mm, FNO = 2.3, HFOV = 62.7°, TTL = 6.347 mm

| Surface Number | Surface Name Object Surface | Surface Shape Spherical | Y radius (mm) Infinite | Thickness (mm) Infinite | Material | Refractive index | Abbe number | Focal Length (mm) |
|---|---|---|---|---|---|---|---|---|
| S1 | First | Aspherical | −7.117 | 0.511 | Plastic | 1.544 | 56.11 | −7.872 |
| S2 | Lens | Aspherical | 11.030 | 0.483 | | | | |
| S3 | Second | Aspherical | 4.592 | 0.467 | Plastic | 1.567 | 37.40 | 875.518 |
| S4 | Lens | Aspherical | 4.465 | 0.125 | | | | |
| STO | Stop | Spherical | Infinite | 0.020 | | | | |
| S5 | Third | Aspherical | 11.428 | 0.750 | Plastic | 1.535 | 55.75 | 2.559 |
| S6 | Lens | Aspherical | −1.519 | 0.154 | | | | |
| S7 | Fourth | Aspherical | 3.268 | 0.309 | Plastic | 1.670 | 19.40 | −11.160 |
| S8 | Lens | Aspherical | 2.188 | 0.445 | | | | |
| S9 | Fifth | Aspherical | −4.002 | 0.900 | Plastic | 1.535 | 55.75 | 2.419 |
| S10 | Lens | Aspherical | −1.055 | 0.082 | | | | |
| S11 | Sixth | Aspherical | 59.841 | 0.500 | Plastic | 1.670 | 19.40 | 8.076 |
| S12 | Lens | Aspherical | −5.929 | 0.030 | | | | |
| S13 | Seventh | Aspherical | −18.544 | 0.450 | Plastic | 1.664 | 20.10 | −2.081 |
| S14 | Lens | Aspherical | 1.507 | 0.488 | | | | |
| S15 | Infrared | Spherical | Infinite | 0.210 | Glass | 1.517 | 64.17 | |
| S16 | Filter | Spherical | Infinite | 0.423 | | | | |
| S17 | Image Surface | Spherical | Infinite | 0.000 | | | | |

Further, the aspheric coefficients of the image side surface or the object side surface of the lenses of the optical system 100 are shown in Table 12, and the definition of each of the parameters can be obtained from the first embodiment, and will not be repeated herein.

TABLE 12

Sixth Embodiment
Aspheric Coefficient

| Surface Number | S1 | S2 | S3 | S4 | S5 | S6 | S7 |
|---|---|---|---|---|---|---|---|
| K | −4.738E+00 | 7.249E+01 | 1.796E+00 | −1.253E+01 | 5.927E+00 | −1.128E+00 | −9.238E+00 |
| A4 | 1.914E−01 | 3.084E−01 | 3.740E−02 | 4.577E−02 | −3.193E−02 | −1.994E−01 | −2.077E−01 |
| A6 | −1.541E−01 | −3.907E−01 | −2.829E−01 | −5.302E−01 | −2.532E−01 | 3.968E−01 | 3.635E−01 |
| A8 | 1.611E−01 | 1.223E+00 | 1.218E+00 | 8.149E+00 | 2.334E+00 | −1.397E+00 | −7.863E−01 |
| A10 | −1.403E−01 | −2.967E+00 | −4.050E+00 | −6.835E+01 | 1.502E+01 | 3.095E+00 | 1.350E+00 |
| A12 | 8.969E−02 | 4.935E+00 | 8.984E+00 | 3.527E+02 | 6.023E+01 | −4.667E+00 | −1.769E+00 |
| A14 | −3.883E−02 | −5.254E+00 | −1.285E+01 | −1.128E+03 | 1.554E+02 | 3.990E+00 | 1.678E+00 |
| A16 | 1.066E−02 | 3.449E+00 | 1.138E+01 | 2.195E+03 | 2.527E+02 | −9.826E−01 | −1.061E+00 |
| A18 | −1.671E−03 | −1.282E+00 | −5.640E+00 | −2.378E+03 | 2.294E+02 | −1.313E+00 | 3.911E−01 |
| A20 | 1.134E−04 | 2.064E−01 | 1.192E+00 | 1.106E+03 | 8.679E+01 | 9.225E−01 | −6.275E−02 |

| Surface Number | S8 | S9 | S10 | S11 | S12 | S13 | S14 |
|---|---|---|---|---|---|---|---|
| K | −7.998E+00 | 3.212E+00 | −1.024E+00 | 5.084E+01 | 2.951E+00 | 4.943E−01 | −1.997E+00 |
| A4 | −7.477E−02 | 4.903E−03 | 2.747E−01 | 5.850E−02 | −7.162E−02 | 3.426E−03 | −9.035E−02 |
| A6 | 1.071E−01 | 1.224E−01 | −3.769E−01 | −9.361E−02 | 1.618E−01 | −5.896E−02 | −1.763E−03 |
| A8 | −1.463E−01 | −2.537E−01 | 4.193E−01 | 8.941E−02 | −1.342E−01 | 4.084E−02 | 1.695E−02 |
| A10 | 1.328E−01 | 3.521E−01 | −3.703E−01 | −7.288E−02 | 5.580E−02 | −1.294E−02 | −7.539E−03 |
| A12 | −7.679E−02 | −3.099E−01 | 2.482E−01 | 3.802E−02 | −1.303E−02 | 2.349E−03 | 1.713E−03 |
| A14 | 2.761E−02 | 1.688E−01 | −1.133E−01 | −1.281E−02 | 1.750E−03 | −2.583E−04 | −2.303E−04 |
| A16 | −6.133E−03 | −5.532E−02 | 3.212E−02 | 2.726E−03 | −1.282E−04 | 1.695E−05 | 1.841E−05 |
| A18 | 8.285E−04 | 1.001E−02 | −5.020E−03 | −3.254E−04 | 4.234E−06 | −6.040E−07 | −8.057E−07 |
| A20 | −6.567E−05 | −7.710E−04 | 3.276E−04 | 1.625E−05 | −2.624E−08 | 8.768E−09 | 1.483E−08 |

In addition, according to the information of parameters described above, the following data can be derived.

| | | | |
|---|---|---|---|
| $100/(f2*|f1|)(mm^{-2})$ | 0.015 | $CT6/|SAG61|$ | 0.960 |
| $\tan(HFOV)/ImgH(mm^{-1})$ | 0.502 | $f7/R14$ | −1.380 |
| $f6/f7$ | −3.885 | $R9/R10$ | 3.793 |
| $f/f5$ | 1.021 | $|R5/R6|/f3(mm^{-1})$ | 2.939 |
| $(R13 + R14)/R14$ | −11.305 | | |

In addition, it can be seen from the aberration diagram in FIG. 12 that the longitudinal spherical aberration, astigmatism, and distortion of the optical system 100 are well controlled, such that the optical system 100 of this embodiment has good imaging quality.

Figure 13:
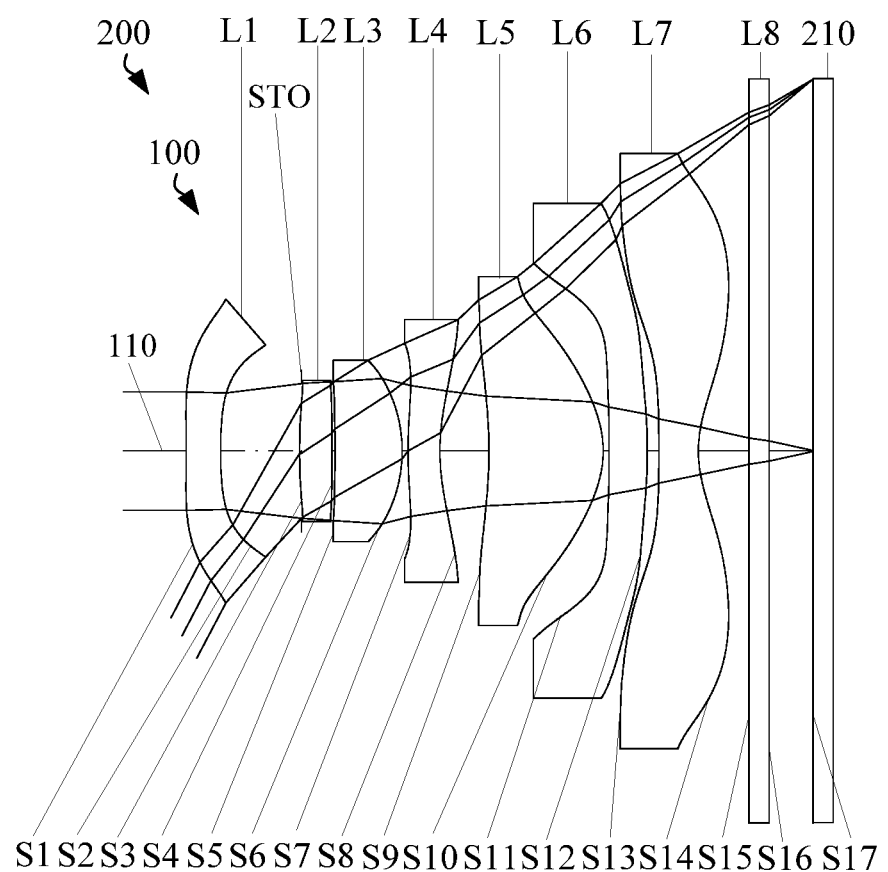
FIG. 13 is a schematic view of a camera module according to an embodiment of the present disclosure.

Referring to FIG. 13, in some embodiments, the optical system 10 and a photosensitive element 210 can be assembled to form an image acquisition module 200. In this case, a photosensitive surface of the photosensitive element 210 can be regard as the image surface S17 of the optical system 100. The image acquisition module 200 is provided with an infrared filter L8. The infrared filter L8 is arranged between the image side surface S14 of the seventh lens L7 and the image surface S17. Specifically, the photosensitive element 210 may be a Charge Coupled Device (CCD) or a Complementary Metal Oxide Semiconductor (CMOS). By applying the above optical system 100 in the image acquisition module 200, the image acquisition module 200 can have wide-angle characteristics to meet the requirements of capturing in large range. In addition, it is also beneficial for the image acquisition module 200 to have high imaging quality, and the requirements of miniaturized design can be met.

Figure 14:
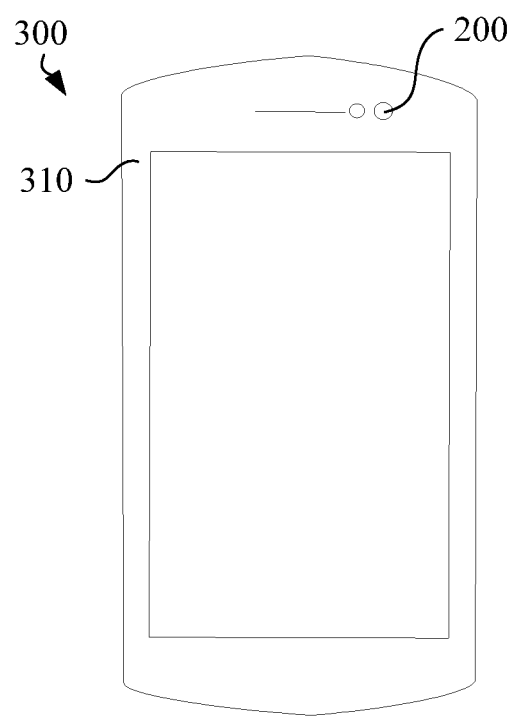
FIG. 14 is a schematic view of an electronic device according to an embodiment of the present disclosure.

Referring to FIGS. 13 and 14, in some embodiments, the image acquisition module 200 is applied in the electronic device 300. The electronic device includes a housing 310. The image acquisition module 200 is located on the housing 310. Specifically, the electronic device 300 may be, but is not limited to, a portable phone, a video phone, a smart phone, an e-book reader, a driving recorder, or other in-vehicle camera device or a wearable device such as a smart watch. When the electronic device 300 is a smart phone, the housing 310 may be a middle frame of the electronic device 300. The image acquisition module 200 is applied in the electronic device 300, such that the electronic device 300 can have wide-angle characteristics to meet the requirements of capturing in large range. In addition, it is also beneficial for the electronic device 300 to have high imaging quality, and the requirements of miniaturized design can be met.

The technical features of the above-described embodiments can be combined arbitrarily. To simplify the description, not all possible combinations of the technical features in the above embodiments are described. However, all of the combinations of these technical features should be considered as being fallen within the scope of the present disclosure, as long as such combinations do not contradict with each other.

The foregoing embodiments merely illustrate some embodiments of the present disclosure, and descriptions thereof are relatively specific and detailed. However, it should not be understood as a limitation to the patent scope of the present disclosure. It should be noted that, a person of ordinary skill in the art may further make some variations and improvements without departing from the concept of the present disclosure, and the variations and improvements falls in the protection scope of the present disclosure. Therefore, the protection scope of the present disclosure shall be subject to the appended claims.

What is claimed is:

1. An optical system, comprising, successively in order from an object side to an image side:
   a first lens having a negative refractive power;
   a second lens having a refractive power, an object side surface of the second lens being convex near an optical axis;
   a third lens having a positive refractive power, an image side surface of the third lens being convex near the optical axis;
   a fourth lens having a negative refractive power;
   a fifth lens having a positive refractive power;
   a sixth lens having a positive refractive power, an image side surface of the sixth lens being convex near the optical axis;
   a seventh lens having negative refractive power, an object side surface of the seventh lens being concave near the optical axis;
   wherein the optical system satisfies the following conditions:

$0 < 100/(f2*|f1|) \leq 2.0$ mm$^{-2}$;

wherein f2 is an effective focal length of the second lens, and f1 is an effective focal length of the first lens, and $0.9 \leq f/f5 \leq 1.4$;

wherein f is an effective focal length of the optical system, and f5 is an effective focal length of the fifth lens.

2. The optical system according to claim 1, further satisfying the following condition:

$0.3$ mm$^{-1} \leq \tan(HFOV)/ImgH \leq 0.56$ mm$^{-1}$;

wherein HFOV is half of the maximum angle of field of view of the optical system, and ImgH is half of an image height of the optical system corresponding to the maximum angle of field of view.

3. The optical system according to claim 1, further satisfying the following condition:

$-8 \leq f6/f7 \leq -3$;

wherein f6 is an effective focal length of the sixth lens, and f7 is an effective focal length of the seventh lens.

4. The optical system according to claim 1, further satisfying the following condition:

$-20 \leq (R13+R14)/R14 \leq -5$;

wherein R13 is a radius of curvature of the object side surface of the seventh lens at the optical axis, and R14 is a radius of curvature of an image side surface of the seventh lens at the optical axis.

5. The optical system according to claim 1, further satisfying the following condition:

$0.4 \leq CT6/|SAG61| \leq 1.1$;

wherein CT6 is a thickness of the sixth lens on the optical axis, and SAG61 is a distance from an intersection between an object side surface of the sixth lens and the optical axis to a portion of the object side surface of the sixth lens having the maximum effective aperture in a direction of the optical axis.

6. The optical system according to claim 1, further satisfying the following condition:

$-1.5 \leq f7/R14 \leq -1.0$;

wherein f7 is an effective focal length of the seventh lens, and R14 is a radius of curvature of an image side surface of the seventh lens at the optical axis.

7. The optical system according to claim 1, further satisfying the following condition:

$3.5 \leq R9/R10 \leq 5.5$;

wherein R9 is a radius of curvature of an object side surface of the fifth lens at the optical axis, and R10 is a radius of curvature of an image side surface of the fifth lens at the optical axis.

8. The optical system according to claim 1, further satisfying the following condition:

$2.0$ mm$^{-1} \leq |R5/R6|/f3 < 4.5$ mm$^{-1}$;

wherein R5 is a radius of curvature of an object side surface of the third lens at the optical axis, R6 is a radius of curvature of the image side surface of the third lens at the optical axis, and f3 is an effective focal length of the third lens.

9. An image acquisition module, comprising a photosensitive element and the optical system according to claim 1, wherein the photosensitive element is arranged on the image side of the optical system.

10. An electronic device, comprising a housing and the image acquisition module according to claim 9, wherein the image acquisition module is located on the housing.

11. An optical system, comprising, successively in order from an object side to an image side:
- a first lens having a negative refractive power;
- a second lens having a refractive power, an object side surface of the second lens being convex near an optical axis;
- a third lens having a positive refractive power, an image side surface of the third lens being convex near the optical axis;
- a fourth lens having a negative refractive power;
- a fifth lens having a positive refractive power;
- a sixth lens having a positive refractive power, an image side surface of the sixth lens being convex near the optical axis;
- a seventh lens having negative refractive power, an object side surface of the seventh lens being concave near the optical axis;

wherein the optical system satisfies the following conditions:

$$0<100/(f2*|f1|) \leq 2.0 \text{ mm}^{-2};$$

wherein f2 is an effective focal length of the second lens, and f1 is an effective focal length of the first lens, and $$-8 \leq f6/f7 \leq -3;$$

wherein f6 is an effective focal length of the sixth lens, and f7 is an effective focal length of the seventh lens.

12. An optical system, comprising, successively in order from an object side to an image side:
- a first lens having a negative refractive power;
- a second lens having a refractive power, an object side surface of the second lens being convex near an optical axis;
- a third lens having a positive refractive power, an image side surface of the third lens being convex near the optical axis;
- a fourth lens having a negative refractive power;
- a fifth lens having a positive refractive power;
- a sixth lens having a positive refractive power, an image side surface of the sixth lens being convex near the optical axis;
- a seventh lens having negative refractive power, an object side surface of the seventh lens being concave near the optical axis;

wherein the optical system satisfies the following conditions:

$$0<100/(f2*|f1|) \leq 2.0 \text{ mm}^{-2};$$

wherein f2 is an effective focal length of the second lens, and f1 is an effective focal length of the first lens, and $$3.5 \leq R9/R10 \leq 5.5;$$

wherein R9 is a radius of curvature of an object side surface of the fifth lens at the optical axis, and R10 is a radius of curvature of an image side surface of the fifth lens at the optical axis.

* * * * *